US011308334B2

(12) United States Patent
Block

(10) Patent No.: US 11,308,334 B2
(45) Date of Patent: Apr. 19, 2022

(54) METHOD AND APPARATUS FOR INTEGRATION OF DETECTED OBJECT IDENTIFIERS AND SEMANTIC SCENE GRAPH NETWORKS FOR CAPTURED VISUAL SCENE BEHAVIOR ESTIMATION

(71) Applicant: Visual Semantics, Inc., Austin, TX (US)

(72) Inventor: Gareth Ian Block, Austin, TX (US)

(73) Assignee: VISUAL SEMANTICS, INC., Austin, TX (US)

( * ) Notice: Subject to any disclaimer, the term of this patent is extended or adjusted under 35 U.S.C. 154(b) by 67 days.

(21) Appl. No.: 16/659,503

(22) Filed: Oct. 21, 2019

(65) Prior Publication Data

US 2020/0050871 A1 Feb. 13, 2020

Related U.S. Application Data

(63) Continuation of application No. 15/823,916, filed on Nov. 28, 2017, now Pat. No. 10,452,923.

(51) Int. Cl.
*G06K 9/00* (2006.01)
*G06K 9/62* (2006.01)

(52) U.S. Cl.
CPC ..... *G06K 9/00771* (2013.01); *G06K 9/00335* (2013.01); *G06K 9/00718* (2013.01);
(Continued)

(58) Field of Classification Search
CPC ........... G06K 9/00771; G06K 9/00335; G06K 9/00718; G06K 9/6277
See application file for complete search history.

(56) References Cited

U.S. PATENT DOCUMENTS

2009/0222388 A1 9/2009 Hua
2010/0195872 A1 8/2010 Velardo
(Continued)

OTHER PUBLICATIONS

J. Johnson, R. Krishna, M. Stark, L. Li, D. A. Shamma, M. S. Bernstein, and L. Fei-Fei, "Image Retrieval using Scene Graphs," 2015 IEEE Conference on Computer Vision and Pattern Recognition (CVPR), Jun. 2015, 1 page.
(Continued)

*Primary Examiner* — Ruiping Li
(74) *Attorney, Agent, or Firm* — Prol Intellectual Property Law, PLLC; H. Kenneth Prol

(57) ABSTRACT

A computer system executing code instructions of a visual scene feature extractor and classifier system comprising a processor executing object recognition on a captured image of a visual scene of interest including a plurality of objects in the visual scene of interest to identify a first object from the plurality of objects with a set of feature attributes wherein the feature attributes include an image view of the first object where the processor executing code instructions for the visual scene feature extractor and classifier to generate a first feature vector value for a first feature attribute of the first object. The processor to generate a first feature space including a neighborhood of labeled, previously-observed first feature vector values around the first feature vector value and to generate a second feature vector value for a second feature attribute of the first object, wherein the second feature vector value is within a second feature space including a neighborhood of labeled, previously-observed second feature vector values and the processor to generate association edges between the first and second feature vector values and the first object and between labeled, previously-observed first and second feature vector values and candidate objects corresponding to previous observations to establish a multiple feature graph for the first object for
(Continued)

determining weighted likelihood that the first object may be identified as at least one previously observed candidate object.

20 Claims, 7 Drawing Sheets

(52) U.S. Cl.
CPC ......... *G06K 9/6267* (2013.01); *G06K 9/6277* (2013.01); *G06K 9/6269* (2013.01)

(56) References Cited

U.S. PATENT DOCUMENTS

| | | |
|---|---|---|
| 2011/0229025 A1 | 9/2011 | Zhao |
| 2016/0063352 A1* | 3/2016 | Scott ........................ G06K 9/46 382/113 |
| 2018/0300540 A1 | 10/2018 | Swisher |
| 2020/0283719 A1* | 9/2020 | Wiles ................. G06K 9/00147 |
| 2020/0327378 A1* | 10/2020 | Smith ................. G06K 9/4623 |

OTHER PUBLICATIONS

W. Liao, M. Ying Yang, H. Ackermann, and B. Rosenhahn, "On Support Relations and Semantic Scene Graphs," Pre-print in arXiv:1609. 05834v2, Sep. 20, 2016, 12 pages.

Y. Li, W. Ouyang, B. Zhou, K. Wang, and X. Wang, "Scene Graph Generation from Objects, Phrases and Region Captions," IEEE International Conference on Computer Vision (ICCV), Apr. 2017, 10 pages.

\* cited by examiner

METHOD AND APPARATUS FOR INTEGRATION OF DETECTED OBJECT IDENTIFIERS AND SEMANTIC SCENE GRAPH NETWORKS FOR CAPTURED VISUAL SCENE BEHAVIOR ESTIMATION

This application is a continuation of prior application Ser. No. 15/823,916, entitled "METHOD AND APPARATUS FOR INTEGRATION OF DETECTED OBJECT IDENTIFIERS AND SEMANTIC SCENE GRAPH NETWORKS FOR CAPTURED VISUAL SCENE BEHAVIOR ESTIMATION," filed on Nov. 28, 2017, which is assigned to the current assignee hereof and is incorporated herein by reference in its entirety.

FIELD OF THE DISCLOSURE

The present disclosure generally relates to a computerized assessment of captured observations including visual scenes through one or more camera systems or other sensors. In some particular aspects, the digital assessment of a captured visual scene may involve integration of objects identified in a scene with semantic scene graph associations to a plurality of feature spaces including contextual data about the objects to estimate semantic behavior in at least one captured visual scene.

BACKGROUND

As the value and use of information continues to increase, individuals and businesses seek additional ways to process and store information. One option available are computer systems that may include many forms and may be networked with access to virtual cloud computing resources, network databases, client systems and the like in various contexts. A computer system generally processes, compiles, stores, and/or communicates information or data for business, personal, or other purposes thereby allowing clients to take advantage of the value of the information. Because technology and information handling needs and requirements vary between different clients or applications, computer systems may also vary regarding what information is handled, how the information is handled, how much information is processed, stored, or communicated, and how quickly and efficiently the information may be processed, stored, or communicated. The variations in computer systems allow for computer systems to be general or configured for a specific client or specific use, such as commercial uses, image capture, audio capture, social networking, web browsing, communications, digital media consumption, digital media generation, data storage, environmental sensors and monitoring, or other typical uses of computing systems. In addition, computer systems may include a variety of hardware and software components that may be configured to process, store, and communicate information and may include one or more computer systems, data storage systems, and networking systems. The computer system may include telecommunication, network communication, and video communication capabilities. Further, the computer system may include image or video capture capabilities, audio capture capabilities, heat signature detection, motion or proximity sensing, or other sensors of the computer system environment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
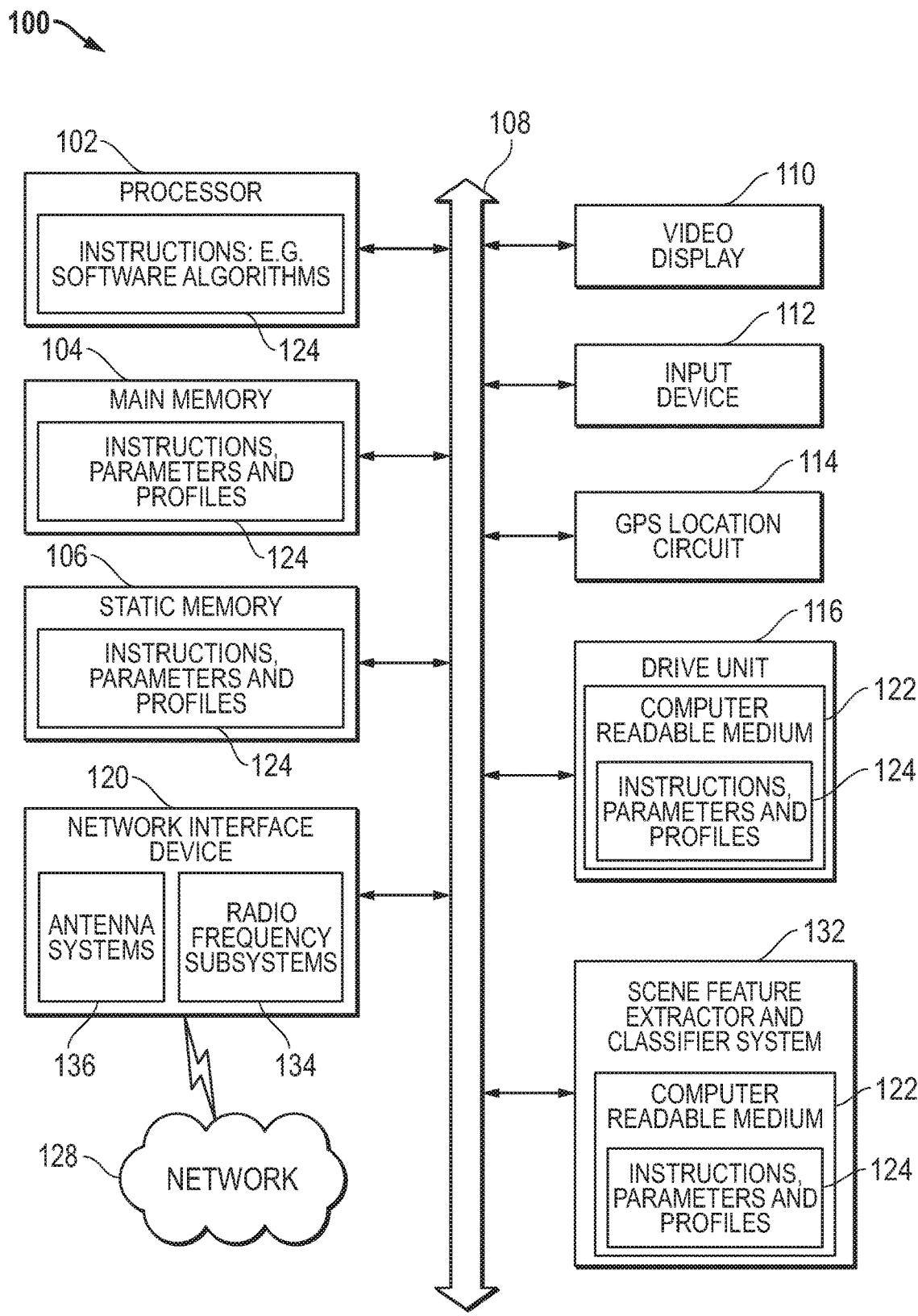
FIG. 1 is a block diagram illustrating a computer system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Current computing infrastructures and digital sensor systems are able to collect information via camera or other visual scene capture systems and via other sensors such as GPS/location sensors, audio sensors, orientation sensors, compass/direction sensors, heat sensors or similar environmental sensors. Further, some computing paradigms may apply face recognition, voice recognition, or other algorithmic analysis of image data, audio data, or even other environmental data to make identification of individuals or other objects within a scene. As computing infrastructure and digital sensor infrastructure evolves worldwide to enable observation of one or more visual scenes, interpretation of data received from a multitude of visual scenes as well as from plural sources of contextual data becomes a more difficult challenge however. Availability of this multitude of visual scene information, from both current and previously recorded visual scenes, as well as contextual data about objects identified, affinities, position, detected environments also provides for possible identification and classification of feature graphs and feature vector spaces as with several embodiments described herein. The feature graphs and developed feature vector spaces may be used to establish semantic associations via a semantic scene graph relating to aspects of a visual scene of interest for identification and determination of associations between objects or other features of the visual scene of interest according to techniques such as the embodiments described herein. Objects identified within visual scenes may also include persons as well as other objects identified within scenes of interest for purposes herein and at times may refer to both persons, living creatures, or other objects such as vehicles, weapons, buildings, or other items that may be identified in a visual scene.

Object identification as well as association with other contextual data sets about those objects, such as persons, and locations in the image are also conducted by a visual scene feature extractor and feature space classification system according to several aspects of the present disclosure. Determination of feature spaces about objects or aspects of the visual scene may yield a multi-feature graph for the one or more objects to provide assessment of feature types observed for the objects identified in a visual scene of interest. Several multi-feature graphs and associated feature vector spaces may be integrated into a semantic scene graph for the visual scene of interest. A semantic scene graph includes associations between identified objects and their multi-feature graphs and provides for assessment of estimated semantic behaviors of objects or persons identified in a visual scene of interest according to some embodiments. The semantic scene graph, in some example embodiments, may establish semantic associations between objects, feature vector spaces associated with the objects, scene attributes, and other aspects as well as the contextual data available for the captured visual scene of interest from other visual scenes or contextual data sources. With this data, labels with estimated likelihoods that are based upon the interrelationship of factors within the semantic scene graph may be generated along association edges between objects or between objects and scene attributes. Such association edges and labels may be used to predict semantic behaviors for objects within a scene of interest.

The scene feature extractor and feature classifier system may develop a semantic scene graph by applying attributes to persons or other objects for an instance of a captured visual scene and relate the present observation instance with previous observations instances and other contextual data available for objects within a visual scene of interest. Each object within a visual scene may be identified as a type of object (e.g., person or other object) however the specifics of the identification may be uncertain. The current instance of observation of a person or other object may yield estimations, based on presently captured environmental data about the object, as to which person or what object is being observed. A multi-feature graph may be generated for the observed object and the several feature types observed about this object. This multi-feature graph may then relate and compare the feature types about the observed object with previously observed instances of similar objects with known labels. In an example embodiment, the multi-feature graph for an object may correlate the currently observed object with one or more feature type observations for similar previously observed objects to provide likelihoods for identification of an observed object. In some aspects, minimum threshold levels of similarity may first need to be met before correlation is done via a multi-feature graph. For example, several image views of the object may be taken and identified as feature types of the object. Audio data or other environmental data may also be captured with respect to the observed object and also identified as feature types of the observed object.

The semantic associations between objects or between objects and feature spaces attributed to an object may be referred to as association edges in some embodiments. The scene feature extractor and feature classifier system develops a series of labels for the features or other attributes associated with one or more objects within a visual scene. Utilizing the feature vector spaces including multi-dimensional assessment of an instance of observation relative to previous instances of similar observations enable the scene feature extractor and feature classifier system to assess likelihood that an association of an observed instance of a feature is associated with an estimated identification of an object to assist in verifying the object (or person). With the association edges, feature vector spaces for observed feature types, and selected candidate objects with labeled, previous observations of feature types, a multi-feature graph for an observed object may be generated. Further, associations of the objects within a captured visual scene with one another or other visual scene attributes such as location via association edges as well as utilizing other available contextual data about hypothesized objects enables an overall semantic scene graph to be established. The semantic scene graph generated by a scene feature extractor and feature classifier system may link objects, including multi-feature graphs for those objects via one or more association edges to establish a semantic assessment of the observed visual scene, including quantified estimations of identities, behaviors, affinities, activity or the like. These additional aspects of the semantic scene graph may be used for verification of an identity or behavior observed in a particular observation instance of a captured visual scene.

In an aspect of the present embodiments, the ontology of the relationships between objects such as people and things for an observation instance may be estimated via the semantic relationships revealed through the operation of the scene feature extractor and feature classification system. Further, robust likelihood estimations of veracity of the objects and relationships between them may be provided by the development of a semantic scene graph according to embodiments of the present disclosures. Assessment of feature vector spaces for features of objects, such as people, may include frontal images, side images, other images, sound signatures, colors, sizes, affinities to other objects, as well as other features that may be attributed to an object. In particular, verification of likelihood of this ontology of relationships between objects is based on current and past observations as well as contextual data gathered to yield development of the semantic scene graph. Behaviors of objects, such as people, may be revealed through determination of ontological relationships assessed with this semantic scene graph from an instance of a captured visual image or other set of captured environmental data. Quantification of likelihoods across labeled association edges between observed objects or candidate objects that may align in identification to the observed objects may establish relative meanings of relationships or affinities between those objects. That network of quantified likelihood levels of relationships between various objects or candidate objects throughout a scene as well as levels of feature attribute alignment may be used to verify likelihood of labels between two or more observed objects that may be used to explain behavior between or among those objects or any sub-components of those objects.

In example aspects, vector feature spaces may be assigned feature vector values which are algorithmically developed values reflecting characteristics of a particular feature type determined for an object within a captured visual scene. For example, a feature may be frontal image of a person and aspects of the frontal image such as spacing, size, colors, relative locations and other aspects of facial features for the person in an image view captured for a visual scene. The observed feature may have a multi-dimensional feature vector value generated for it which may be used to correlate it to other instances of captured frontal images of people or objects previously observed. Nearness in the feature vector values of past instances for the frontal images of persons, including candidate people within the captured image, may be assessed for calculations of likelihood that a currently observed frontal image instance aligns with frontal image instances previously recorded.

Previously-observed people whose feature vector values are compared to currently observed feature vector values may be culled in some embodiments to include people likely to appear in the capture visual scene of the current instance. Determination of candidate persons or objects to be correlated with currently observed feature attributes of an object may be based for example on some minimum threshold of nearness to observed feature vector values in some embodiments. For example, a nearness threshold to an observed feature vector value may establish a neighborhood around the feature vector value for a feature type within which only previously observed feature vector nodes are considered for correlation. In other example embodiments, a subset of potential candidate objects, such as persons, may be pre-selected for analysis if focused culling of potential candidates is desired.

These feature vector values for a currently observed feature of an object uniquely identify designated feature spaces about the objects or other aspects identified within the visual scene of interest. Feature space vector nodes may have confidence levels associated with them and may also include identifying or descriptive labels from the classification system. Associations, which may be represented as edges in a multi-feature graph as well as a semantic scene graph in some embodiments, may also have confidence levels associated with them for comparison by the visual scene feature extractor and feature classification system. The labeling may also be descriptive of the type of association. Not all feature space vector nodes or semantic association vectors will have confidence levels in some embodiments.

Analysis of the confidence levels for an object node identification or for one or more semantic association edges from the feature space vector nodes connected by the edges may be used to determine conclusions about associations or an identity of an object or objects observed. With the likelihood levels for object identification as well as association edges describing affinities or relationships of a semantic scene graph with multi-feature graphs, the scene feature extractor and feature classification system may be used to estimate semantic behaviors of objects within the visual scene of interest. Confidence levels of association edges between feature vector nodes of a candidate object and an observed feature vector node may indicate closeness or estimated accuracy of the associations to identify an observed object from a multi-feature graph.

With the classification and comparison of objects identified in a multi-feature graph and integrated into the semantic association graph including association edges between object nodes, the visual scene feature extractor and feature space classification system may be used to digitally estimate behaviors in at least one captured visual scene of interest. Further, blending sequences of scenes such as with video of a visual scene of interest may identify features relating to movement or activity as well to identify behavior of identified objects within a plurality of sequential visual scenes of interest in other embodiments. As described further herein, the captured visual scene of interest may be still image or a set of still images or may be part of a sequence of video images captured from one or more camera systems and may further include capture visual scenes that are both current and past. Additional real time or past contextual data may be included with the visual scene of interest to include sensor inputs such as global position detection, audio detection, heat signatures, time indications, or other environmental indicators. Contextual data for an object may further include affinities of objects for other objects, such as people, to establish relationships that are used by the scene feature extractor and feature classification system.

The visual scene feature extractor and feature space classification system of embodiments herein is a particularized system to provide for analysis and efficiency of analysis of captured visual scene data, environmental context, and contextual data relating to the objects identified or other aspects of the visual scene of interest. This particularized system executing code instructions of the visual scene feature extractor and feature space classification system may be used to digitally assess behavior of persons or objects within a captured visual scene for security, commercial activity, entertainment, or other purposes in the various embodiments disclosed herein.

FIG. 1 illustrates a computer system 100 similar to computer systems according to several aspects of the present disclosure. In the embodiments described herein, a computer system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, a computer system can be a personal computer, mobile device (e.g., personal digital assistant (PDA) or smart phone), server (e.g., blade server or rack server), a consumer electronic device, a network server or storage device, a network router, switch, bridge, wireless router, access point, edge computing system or other network communication device, a laptop computer, a desktop computer, a communications device, a control system, a camera, a sensor device, or any other suitable machine capable of executing a set of instructions (sequential or otherwise) that specify actions to be taken by that machine, and can vary in size, shape, performance, price, and functionality.

In a networked deployment, the computer system 100 may operate in the capacity of a server or as a client user computer in a server-client user network environment, or as a peer computer system in a peer-to-peer (or distributed) network environment. In a particular embodiment, the computer system 100 can be implemented using electronic devices that provide voice, video or data communication. For example, a computer system 100 may be any mobile or other computing device capable of executing a set of instructions (sequential or otherwise) that specify actions to be taken by that machine. Further, while a single computer system 100 is illustrated, the term "system" shall also be taken to include any collection of systems or subsystems that individually or jointly execute a set, or multiple sets, of instructions to perform one or more computer functions.

The computer system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the computer system can include one or more storage devices, one or more communications ports for communicating with external devices, as well as, various input and output (I/O) devices, such as a keyboard, a mouse, a video/graphic display, or any combination thereof. The computer system can also include one or more buses operable to transmit communications between the various hardware components. Portions of a computer system may themselves be considered computer systems.

FIG. 1 shows a computer system 100 capable of administering each of the specific embodiments of the present disclosure. For example, the computer system 100 can represent an integration server or database for a scene feature extractor and feature classifier system 132 according to embodiments of the present disclosure. A camera system, mobile device, recording system, or other environmental sensor for acquiring a visual scene for analysis under the embodiments of the present disclosure. Further, computer system 100 may serve as a gateway device or other devices for providing networked or cloud connectivity to remotely located scene feature extractor and feature classifier system 132 according to some embodiments herein. For example, computer system 100 may also represent a networked server or other system and administer some or all aspects of the scene feature extractor and feature classifier system 132 via instructions executed on a processor according to various embodiments herein.

Computer system 100 can include devices or modules that embody one or more of the devices or execute instructions for the one or more systems and modules described above, and operates to perform one or more of the methods described above. The computer system 100 may execute code instructions 124 that may operate on servers or systems, remote data centers, or on-box in individual client computer systems according to various embodiments herein. In some embodiments, it is understood any or all portions of code instructions 124 may operate on a plurality of computer systems 100.

The computer system 100 may include a processor 102 such as a central processing unit (CPU), control logic or some combination of the same. Any of the processing resources may operate to execute code that is either firmware or software code. Moreover, the computer system 100 can include memory such as main memory 104, static memory 106, computer readable medium 122 storing instructions 124 of the security credential provisioning system 132, and drive unit 116 (volatile (e.g. random-access memory, etc.), nonvolatile (read-only memory, flash memory etc.) or any combination thereof). The computer system 100 can also include one or more buses 108 operable to transmit communications between the various hardware components such as any combination of various input and output (I/O) devices.

As shown, the computer system 100 may further include a video display 110. The video display 110 in an embodiment may function as a liquid crystal display (LCD), an organic light emitting diode (OLED), a flat panel display, a solid state display, or a cathode ray tube (CRT). Additionally, the computer system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile, semi-mobile, and/or stationary computer system.

The computer system 100 can also include a disk drive unit 116. The computer system 100 can also represent a server device whose resources can be shared by multiple client devices, or it can represent an individual client device, such as a desktop personal computer, a laptop computer, a tablet computer, a wall-mounted display, or a mobile Smartphone in example embodiments.

Network interface device 120 represents a NIC disposed within computer system 100, on a main circuit board of the computer system, integrated onto another component such as processor 102, in another suitable location, or a combination thereof. The network interface device 120 can include another computer system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, wireless controller circuitry, amplifiers and other circuitry for wireless communications.

The computer system 100 can include a set of instructions 124 that can be executed to cause the computer system to perform any one or more of the methods or computer based functions disclosed herein. For example, instructions 124 may execute the scene feature extractor and feature classifier system 132, software agents, or other aspects or components. Additionally, various software modules comprising application instructions 124 may be coordinated by an operating system (OS), and/or via an application programming interface (API). An example operating system may include Linux®, Windows®, Android®, and other OS types known in the art. Example APIs may include Linux kernel APIs such as POSIX Win 32, Core Java API, or Android APIs.

The disk drive unit 116 may include a computer-readable medium 122 in which one or more sets of instructions 124 such as software can be embedded. In a particular example, a storage unit may store the scene feature extractor and feature classifier system 132 computer-readable medium 122 in which one or more sets of instructions 124 related to the operation of the scene feature extractor and feature classifier system 132. Similarly, main memory 104 and static memory 106 may also contain a computer-readable medium for storage of one or more sets of instructions, parameters, or profiles 124 including access to stored feature records, object associations, external contextual data regarding objects, and determination of likelihood levels, association edges, feature spaces, feature vector values, and other aspects of the scene feature extractor and feature classifier system 132. In a particular embodiment, the instructions, parameters, and profiles 124 may reside completely, or at least partially, within the main memory 104, the static memory 106, and/or within the disk drive 116 during execution by the processor 102 of computer system 100. As explained, some or all of the scene feature extractor and feature classifier system 132 may be executed locally or remotely.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. Accordingly, the disclosure is considered to include any one or more of a computer-readable medium or a distribution medium and other equivalents and successor media, in which data or instructions may be stored.

The computer system 100 may also include a scene feature extractor and feature classifier system 132 that may be operably connected to the bus 108. In an embodiment, the scene feature extractor and feature classifier system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory. The scene feature extractor and feature classifier system 132 computer readable medium 122 may also contain space for data storage for processing of values, likelihood estimations, attribute designations, and labels as well as feature spaces, multi-feature graphs, and semantic scene graphs during processing.

In some embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of a computer system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the computer system. The system, device, controller, or module can also include a combination of the foregoing examples of hardware or software. Note that a computer system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
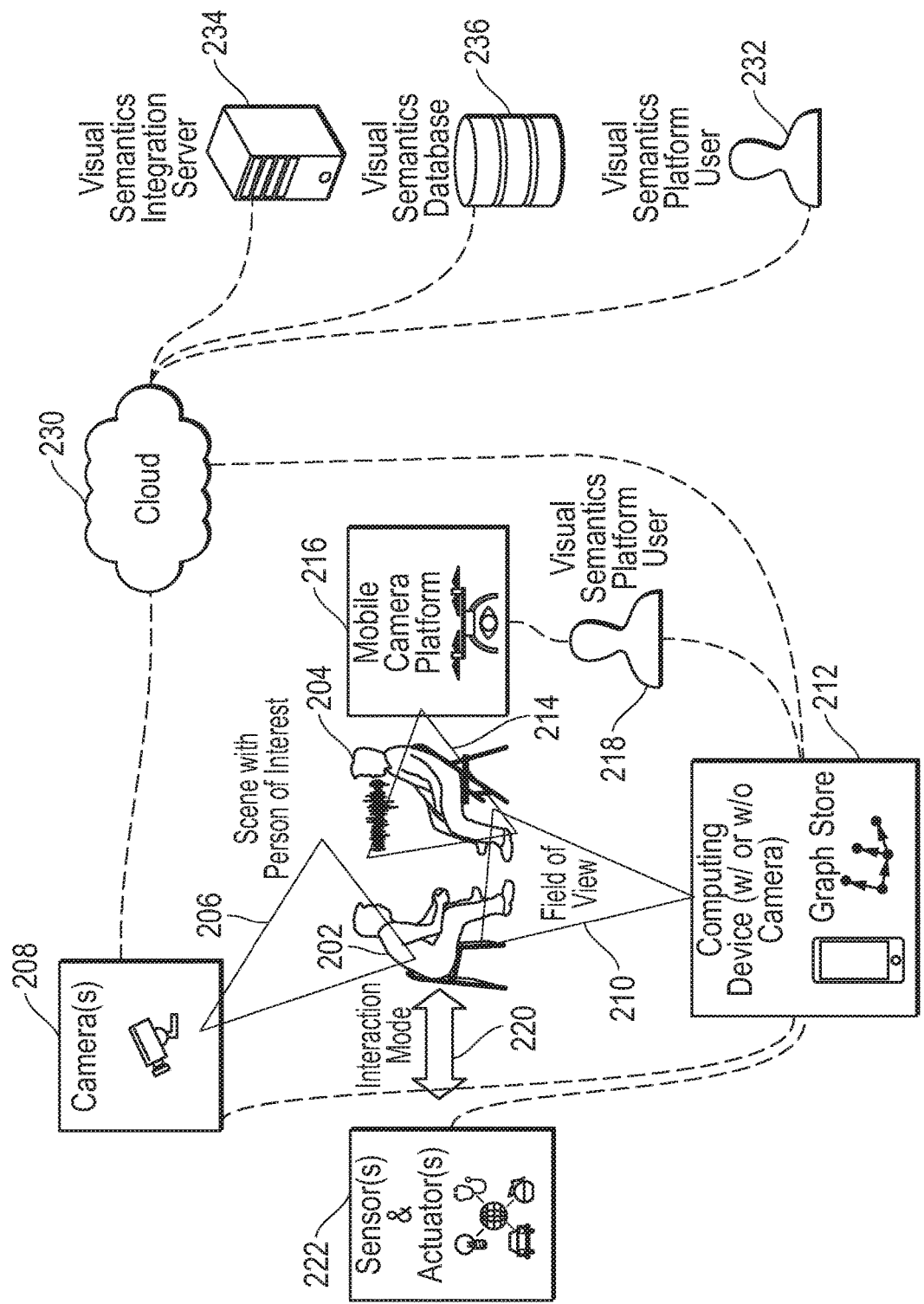
FIG. 2 is a block diagram illustrating a network of connected devices and a visual scene feature extractor and feature classifier system according to an embodiment of the present disclosure.

FIG. 2 is a block diagram illustrating a scene feature extractor and feature classifier system operating on an integration server 234 and accessing a scene feature classification database 236 including a plurality of available previous instances of features as well as contextual information about persons or other objects within a scene of interest. The scene of interest may contain a plurality of objects including one or more persons 202 and 204 as well as other objects within the scene. Each object identified in a scene of interest may be assigned an observed object node in a semantic scene graph. Objects such as persons 202 and 204, may have sub-component objects associated. For example, body parts such as an arm, hand, leg, torso, or objects near or with a person such as a vehicle, weapon, attire, or the like may be sub-components in some embodiments. One or more persons may be a person of interest for which an identity is sought. For example, person 204 may be a person of interest whose identity is unclear in an example implementation of the scene feature extractor and feature classification system.

One or more camera systems 208 may capture images of the scene of interest. Additional sources of visual scene images and audio sampling may also be implemented to capture visual, auditory or other aspects of the scene of interest with persons 202 and 204. Cameras 208 may have one or more fields of view 206 of the scene of interest. In another example, a mobile camera platform 216 may be one mounted on a drone, helicopter, or other vehicle. Mobile camera platform 216 may capture visual images through field of view 214 as well as other environmental data about the scene of interest. In a further example, a local computing device 212, such as a mobile phone or other device, may additionally capture aspects of the scene of interest in some embodiments. Local computing device 212 may have a field of view 210 of the scene of interest. In an aspect, the local computing device 212 may have a camera system, microphone, or other environmental sensors for capturing data about the scene of interest. The scene of interest may further be surveyed via interaction 220 with one or more additional environmental sensors 222. Example environmental sensors may include location/GPS detectors, lighting level sensors, microphones, biometric sensors, vehicular sensors, infrared detectors, or other environmental sensors to detect aspects of the scene of interest.

In several aspects a scene feature extractor and feature classifier system platform user 232 may operate the scene feature extractor and feature classifier system remotely via a cloud based network connection 230 to observe and analyze behavior of objects, such as people, from a remotely located scene of interest. In yet other aspects, a scene feature extractor and feature classifier system platform user 218 may also operate the scene feature extractor and feature classifier system platform locally such as via a local computing device 212. Local computing device 212 may store semantic scene graph information received in whole or in parts from a remote scene feature extractor and feature classifier system integration server 234 and database 236 via a cloud connection 230 in some embodiments. For example, some or all of feature spaces, contextual data, and recognition pipeline activity may be received from a remote scene feature extractor and feature classifier system integration server. Generation of a semantic scene graph with developed associations may occur on a local computing device in some embodiments. In other aspects, local computing device 212 may conduct determination of semantic scene graph generation entirely locally or with access to remotely connected databases 236 for contextual background data and stored previous instances of feature detection.

It is further understood that a scene feature extractor and feature classifier system user 218 or 232 may operate the camera systems 208, remote camera platforms 216, of various sensors or actuators 222 as appropriate to obtain desired real time instance data for an observation of a scene of interest. In some example embodiments, the camera systems 208, or remote camera platforms 216, and sensors 222 may be network connected with an information handling system operating the scene feature extractor and feature classifier system. In other example embodiments, the camera systems 208, or remote camera platforms 216, and sensors 222 may be co-located with an information handling system, such as 212 operating the scene feature extractor and feature classifier system locally and connected to the camera systems and sensors and actuators via a bus connection. In such an example embodiment, a mobile industry processor interface (MIPI) or other connection may be used as a bus between the camera capturing a visual image and a processor executing a scene feature extractor and feature classifier system according to embodiments herein. In particular, a scene feature extractor and feature classifier system user 218 or 232 may obtain particular image or other real time observation data for people or other objects within the scene of interest with guided focus on objects or aspects of the scene of interest.

Figure 3:
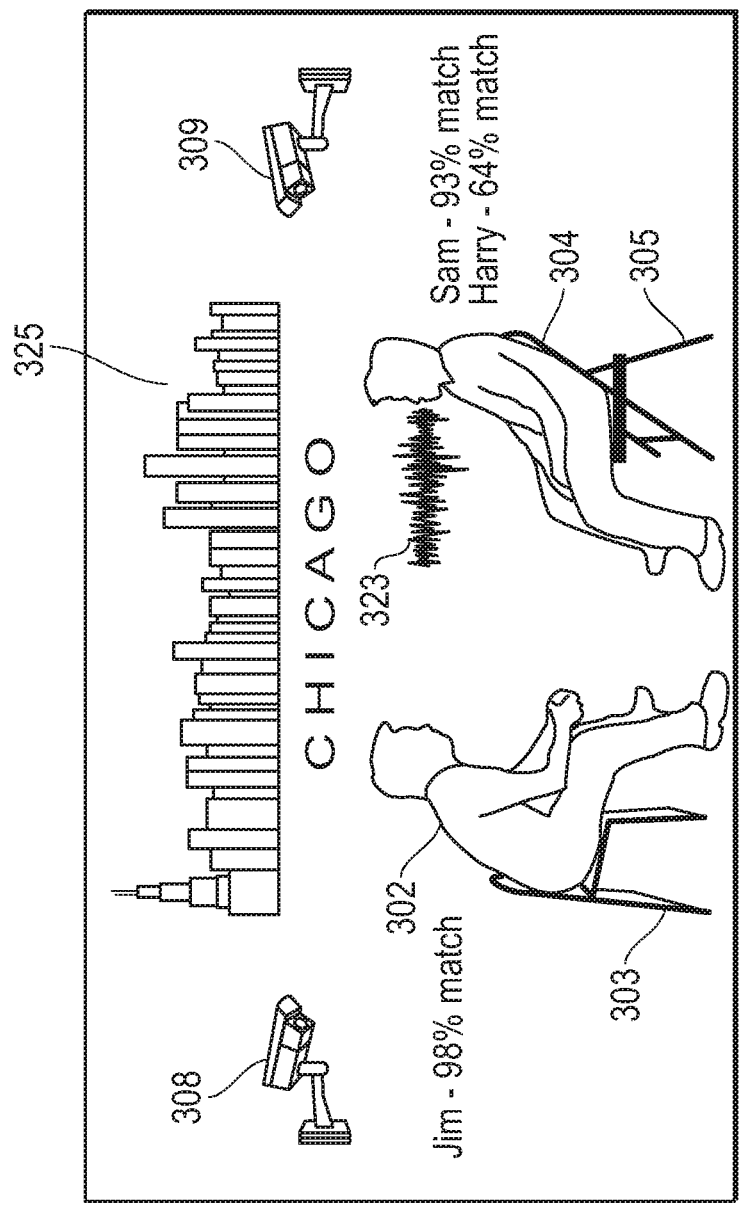
FIG. 3 is a graphical diagram illustrating an example real-time view of a visual scene according to an embodiment of the present disclosure.

FIG. 3 is a graphical diagram illustrating an example of a real time scene of interest 300. The real time scene of interest 300 depicted in FIG. 3 is an example only and depicts several aspects of one type of predicted behavior assessed by the scene feature extractor and feature classifier system according to embodiments herein. The scene of interest 300 may be observed in real time via camera systems such as 308 and 309 which may be located in a known location 325. In particular, the location 325 may be general such as a city (Chicago) or may be a particular location determined via GPS coordinates or the like. The scene of interest 300 depicts several objects 302-305. It is understood that any number of objects may be depicted and captured in visual images or other detected environmental sensor data obtained from a scene of interest 300. For simplicity, objects 302-305 are discussed in the present embodiment. As a first aspect, persons 302 and 304 are captured in the real time scene of interest 300. Additionally, objects 303 and 305 are chairs in which persons 302 and 304 are sitting may also be identified as objects in the captured visual scene of interest. Indication of persons 302 and 304 sitting in chairs 303 and 305 nearby to one another may be information suggesting a meeting is taking place. In addition to visual fields of view for captured images of the visual scene of interest 300, audio data 323 may capture recorded conversation from one or both persons of interest 302 and 304. In the presently depicted example, auditory recording 323 from speech by person of interest 304 may be recorded in real time with the captured visual images of the scene of interest 300.

In the example of FIG. 3, person 302 may be identified by comparison of features and feature spaces to previous instance of captured feature data such that person 302 is believed to be "Jim" at a likelihood of 98% match. Additionally, other factors may also place Jim at a location 325 in Chicago. For example, contextual data determined from a social media feed such as Twitter®, Facebook Instagram®, or the like may provide indication of Jim's location. Additional contextual data may be used such as known residences, places of work, or hangout locations for "Jim." Further, data relating to tracking of "Jim's" mobile device location or vehicle may be accessed in some embodiments as contextual information about Jim's location. In yet other aspects, previous location feature instances for "Jim" or other information about "Jim" may be gathered and stored in the scene feature extractor and feature classifier system databases and indicate frequent appearance in Chicago 325.

The scene feature extractor and feature classifier system may operate to determine a particular behavior of "Jim" within a real time scene of interest. In a particular example, the question may be as to who "Jim" is meeting with or who "Jim" may associate with at the time and location 325 observed. In an example embodiment, the scene feature extractor and feature classifier system may be attempting to determine the identity of person 304. As shown, several features may be assessed with respect to feature spaces, association edges, and the like described further herein to make an assessment of person 304. The match of person 304 may be provided on a likelihood level based on a semantic scene graph generation of scene of interest 300 such that either "Sam" or "Harry" may be ultimately weighed as candidates for person 304 according to an embodiment. Several attributes for person 304 may be assessed including a location 325, likelihood for candidates who may be person 304, and attributes that are features of person 304 captured from the scene of interest. The presently-observed features are compared with one or more previous instances of the feature recorded by the scene feature extractor and feature classification system. For example, two or more fields of view of person 304 may be captured from cameras 308 and 309. Each real time field of view of person 304 may be an attribute designated as a feature type. For example, camera 308 may capture a frontal view of person 304 while camera 309 may capture a left or right side view, back view, or other view of person 304. Each of these is a current instance of feature of person 304. Comparison with previous instances of multiple views of candidate persons who may be person 304 may be constructed by embodiments herein to assess person 304 through multiple feature spaces. Feature vector values are generated for each classified feature for a current instance of an attribute, such as an image view, and may be compared within feature spaces for nearness to multi-dimensional feature vector values for previous instances of image views of candidate persons who may be person 304. Feature vector values in a feature space may be comprised of many dimensions due to algorithmic processing of an image view instance for a feature type. For example, a frontal view of an object that is a person may have many defining aspects within the frontal image that may be important aspects to defining the uniqueness of the captured image for identification purposes. These uniqueness aspects may result in several dimension values from an algorithm that generates a feature vector value for a feature type such as a frontal image view. In several examples, any number of dimensions is contemplated. In one example embodiment, up to 120 dimension values may be used to represent a feature vector value.

Other environmental aspects may be utilized as attributes classified as features for comparison between the currently observed instance and previous instances stored for candidate persons who may be person 304. In the particularly shown example, a current instance of voice recording 323 may be used as a feature for match to previous voice recordings of candidate persons through feature space nearness comparison along with any other features (e.g. available visual views) to determine likelihood of the identity of person 304. Further aspects of the operation of scene feature extractor and feature classifier system to predict a behavior such as a meeting between persons 302 and 304, or more particularly a meeting between "Jim" and "Sam" or "Harry" may be clear in the embodiments described herein.

Figure 4:
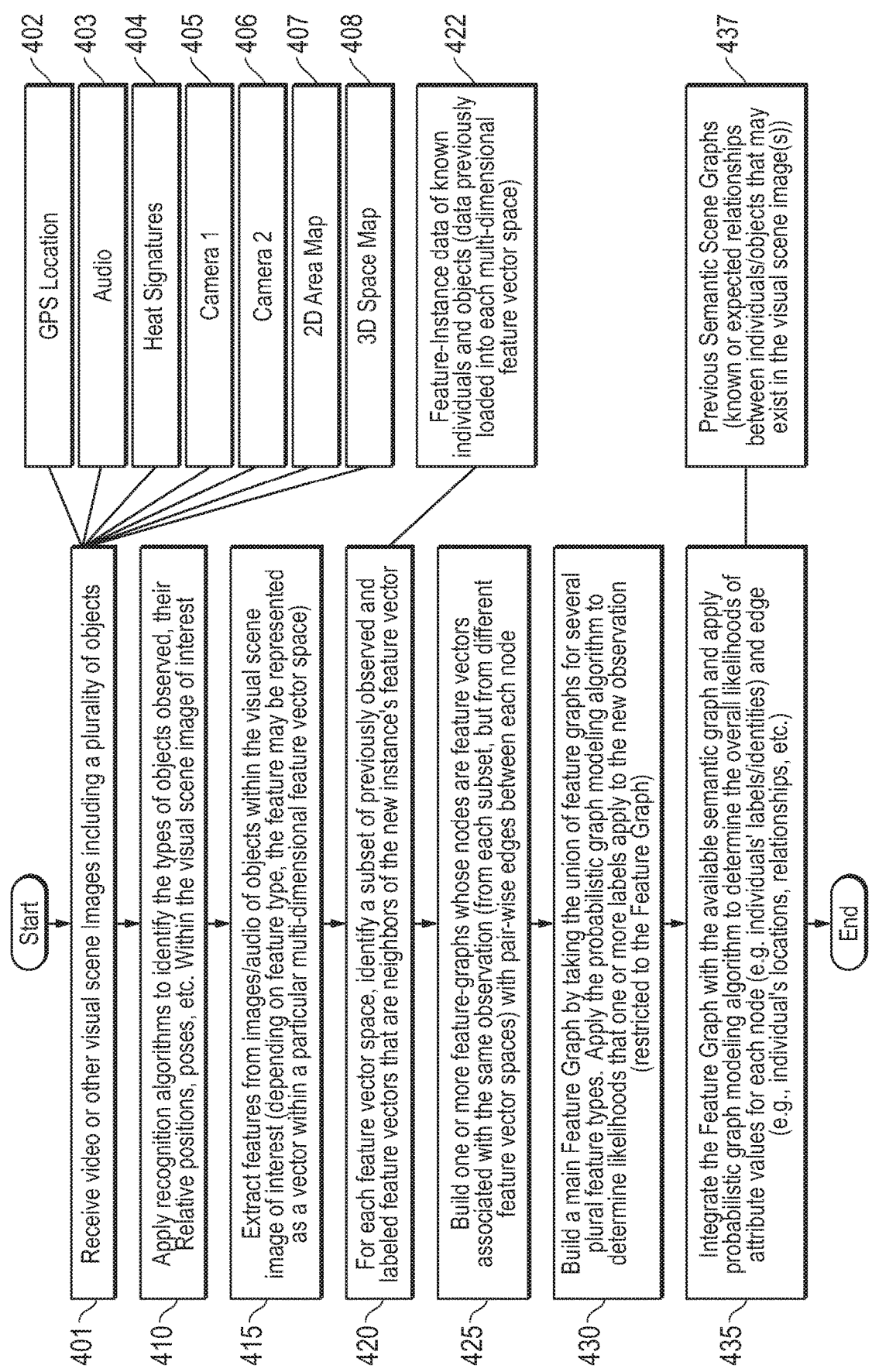
FIG. 4 is a flow diagram illustrating a method of establishing a multi-feature graph for integrated object feature spaces from at least one captured visual scene according to an embodiment of the present disclosure.

FIG. 4 is a flow diagram showing the operation of the scene feature extractor and feature classifier system according to an embodiment of the present disclosure. In a particular aspect, FIG. 4 shows operation of a recognition pipeline for utilizing feature spaces and feature vectors linked to feature spaces in generation of a multiple feature graph. Multiple feature graphs may be used to assess aspects or identity about one or more objects within a scene of interest. An example multiple feature graph is shown in FIG. 5 according to an embodiment.

Figure 5:
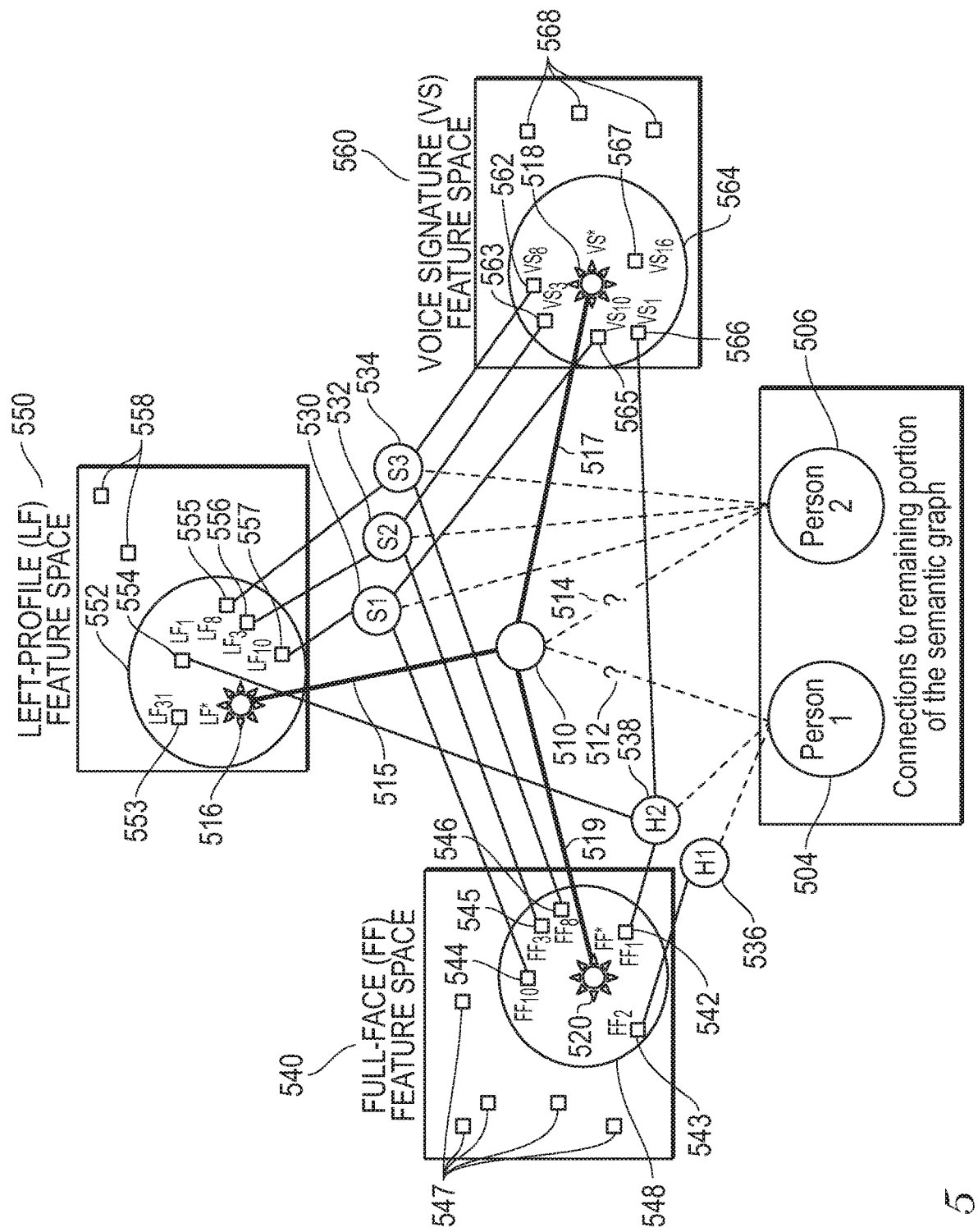
FIG. 5 is a graphic diagram illustrating a multi-feature graph and feature vector spaces for objects from at least one captured visual scene as determined by a scene feature extractor and feature classifier system according to an embodiment of the present disclosure.

FIG. 5 is a graphical diagram showing an example embodiment of a multiple feature graph for an object within a captured scene of interest generated by the scene feature extractor and feature classifier system according to embodiments of the present disclosure. In the example of FIG. 5, a multiple feature graph is depicted for a person detected in the scene of interest. For example, person 304 may be detected in scene of interest 300 as shown above in FIG. 3. The person may be either "Harry" 504 or "Sam" 506 as shown in FIG. 5, but identity may yet to be determined. Each potential person node 504 and 506 may be linked to remaining portions of a semantic scene graph generated by the scene feature extractor and feature classification system. The broader semantic scene graph is discussed further in embodiments herein. Several features 540, 550, and 560 may be assessed in the multiple feature graph for person such as 510 for whom an identity is sought and behavior is assessed. Further detail of the multiple feature graph of a person of interest within a captured visual scene is described below.

Turning to the flow chart of FIG. 4 describing the recognition pipeline according to some embodiments, the scene feature extractor and feature classifier system may commence analysis of an instance of capture of a real time scene at 401. At 401, one or more aspects of a current instance of a visual scene may be captured. This may include a plurality of images received from one or more camera systems such as camera 1 405 and camera 2 406. Any number of visual images may be received in various embodiments including images focused or directed at different viewing angles from the same camera system. Additional environmental data relating to the instance of capture for a visual scene of interest may further be received. For example, audio data 403 may be captured from the visual scene of interest from one or more microphone systems. This data may then be a processor executing code instructions of a scene feature extractor and feature classifier system according to embodiments herein. The visual scene of interest may be received via a local bus connection such as a MIPI or other connection from the camera systems or may be received via a networked connection at the scene feature extractor and feature classifier system in various embodiments. Location data 402 may be captured from any of several available location determination techniques known in the art. For example, GPS location systems, mobile information handling system multilateration locator systems, known positions of camera systems 405 and 406, image recognition of locations in captured images, and other techniques may be used for determination of location data 402.

Additional current instance visual scene environmental information may also be captured or retrieved. In an example aspect, the scene feature extractor and feature classifier system may access or retrieve a 2D area map 407 or a 3D spatial map 408 for a location. Area map 407 or spatial map 408 may be available from private mapping databases or publicly available mapping databases such as GoogleMaps®, MapQuest®, or similar web mapping database services or geographical information systems.

Additional environmental data about a visual scene of interest may be captured via sensors in accordance with the descriptions herein. A variety of sensors and actuators=may operate with a scene feature extractor and feature classifier system to capture an instance of a scene. For example, heat signature data 404 may be captured by an infrared camera system or other heat detection system about the visual scene of interest. In some embodiments, a camera system such as 405 or 406 may capture both a visual image and a heat signature image. In an example embodiment, heat signature may be utilized to assist in determining living objects within a visual scene of interest or even may be particular to identification of persons or other objects within the scene of interest. Other environmental detectors may be used to determine aspects of a visual scene of interest in a capture instance as well. Those may include light level detectors, LIDAR, RADAR, infrared-based and other types of motion detectors, SONAR and ultrasonic distance measurements, magnetic field detectors, acceleration and gravity (and gravity tensor) detectors, electromagnetic and particle radiation detectors (not shown in FIG. 4) and the like.

The captured visual scene of interest in an instance of capture may include at least a plurality of images from 405 or 406, and audio 403 collected by cameras or microphones in some embodiments. Any combination of images with various fields of view, audio data and data from various sensors or actuators in the area of the visual scene of interest is contemplated. The capture instance of a visual scene of interest may contain a plurality of objects within the visual scene of interest of which behaviors and relationships are of interest. Assessment of these objects and their inter-relation is utilized by the scene feature extractor and feature classifier system to estimate behavior of those objects at a particular instance. For clarity, one or more persons may appear in the captured instance of the scene of interest and persons are considered a subset of objects within a visual scene of interest.

Proceeding to 410, the scene feature extractor and feature classifier system may apply recognition algorithms to identify types of objects within the instance of observation for a captured scene of interest. The scene feature extractor and feature classifier system may apply recognition algorithms within fields of view from various available images to identify types of objects observed in an instance of a scene of interest. Example algorithms that may be applied include both classical and so-called "Deep" Neural Networks (NN's and DNN's respectively), various feature extractors in combination with Support Vector Machines (SVM's), as well as classifiers based on decision trees, cascades of detectors and deformable parts models. Further details of the object may be determined via the recognition algorithms applied to one or more fields of view from acquired images including relative positions of objects with respect to one another and within the visual scene of interest. Further pose recognition may be applied to one or more of the objects to determine poses such as those for persons in an instance of a visual scene of interest. Example algorithms may include pose estimation determined directly from NN's and DNN's, as well as identification of visual landmarks combined with methods such as random trees to ascertain object orientation and/or pose.

Object recognition algorithms for computer vision used with some of the present embodiments are trained using a dataset consisting of multiple images, each of which contains either the object to be recognized ("positive" examples) or one or more objects that are not visually similar to the object to be recognized ("negative" examples). Each image in the training dataset is presumed to be correctly labeled as either a positive or negative example. In most cases, the recognition algorithm depends on certain parameters that needed to be tuned so the algorithm can effectively classify an observation as a positive or negative example of the desired object type. Training the algorithm amounts to modifying the parameters so as to maximize the number of correctly classified positive examples and minimize the number of negative examples classified incorrectly as positive examples. Other optimization procedures include modifying the algorithms in order to minimize the number of computational steps and/or to decrease the number of parameters required (to increase speed and/or decrease the burden of storing parameters) while still retaining a certain threshold of classification performance. While algorithmic methods vary considerably, work flows may involve the following steps: (1) mathematical operations that act on groups of pixels in the original, raw image; (2) determination of certain mathematical features of these groups of pixels at one or more scales of the image; (3) combination of the features generated over one group of pixels with features generated over another group of pixels in order to assign one or more portions of the image with a certain classification estimate, which may be a single numerical value or a multi-dimensional vector of values. The estimate indicates the algorithm's prediction that the target object is present in that portion of the image. A threshold may be applied to the estimate (or a function of the estimate) to obtain a binary result as to whether the object of interest exists or does not exist in either the full image or a portion thereof.

Determination of which objects within a captured scene of interest to analyze via the scene feature extractor and feature classifier system may be pre-defined for object recognition and identification in some embodiments. For example, object types such as persons, weapons, or vehicles may be selected for identification and analysis in some embodiments. In other embodiments, specific objects may be selected and a pre-defined minimum similarity threshold level to the selected object or objects for search may be applied to limit consideration to objects with those characteristics within a visual scene of interest. Other criteria may be utilized, too, including physical proximity to another object of interest, affinity with another object of interest, or other criteria levels as discussed herein or understood to be relevant for selecting objects for analysis within a capture visual scene.

At 415, the scene feature extractor and feature classifier system will extract features from the one or more images captured of an instance of a scene of interest. Some features may simply be attributes associated with the visual scene, such as a location. Other features may be feature attributes associated with the observation of an object. Feature attributes may have previous instances of observation for that feature attribute available in the scene feature extractor and feature classifier system data bases for similar objects. In the latter case, prior instances of this type of feature attribute may be represented as feature vector instances or nodes relating to those prior observations. Each feature attribute may be a calculated feature vector value. The calculated feature vector value may be generated by the scene feature extractor and feature classifier system using an algorithm for generating a representative value to capture unique aspects of a feature that may distinguish an instance of a feature from similar types of features but of a different object.

Example feature vector value generating algorithms may include application of NN's, DNN's, Histogram of Oriented Gradients (HOG), and other algorithms (e.g., FAST, ORB, SIFT, SURF, etc.). Some algorithms for generating feature vector values are particular to a type of feature, although in many embodiments the process may group algorithms into categories as to whether they are useful for characterizing features in images, time series and audio signals, graph networks, and other types of structured and unstructured data. In another aspect, these feature vector values for particular feature types are generated hash-like values applied to aspects of a particular feature attribute with values in several dimensions. For example, a feature type may include a full-face or frontal image of an object, a left-profile image, a right profile image, or another image field of view of an object type. Other features may include sound identification applied to an auditory recording from speech or other sound generated by an object identified in a scene of interest. In an aspect of embodiments herein, for a feature attribute observed in an instance of a visual scene of interest, the scene feature extractor and feature classifier system may apply a feature vector value algorithm to generate a current-instance feature vector value for that feature type. The current-instance feature vector value may become a feature vector node in a feature space for comparison to past-instance feature vector values for features of a similar type.

An example multi-dimensional vector value generation algorithm is based on neural networks, and many feature extractor algorithms also lead to vector-valued descriptions of their inputs. Neural networks are a set of algorithms that are designed to recognize patterns. They interpret sensory data through machine perception which labels and or clusters raw input. The patterns they recognize are numerical, contained in vectors, into which all detected real-world sensor data, be it images, sound, text or time series, must be translated. Neural networks are composed of one or more layers of nodes where computation happens upon encountering sufficient detected sensor data input stimuli. A node combines sensor input from the data with a set of coefficients, or weights, that either amplify or dampen that input, thereby assigning significance to inputs for the task the algorithm is trying to learn. Deep neural networks are composed of stacks of neural networks. Training both NN's and DNN's allows the coefficients to become fixed at values that allow the resulting network to reliably classify objects for examples that are outside the training data set. It is possible to extract the vector-valued representations within NN's and DNN's at each of their layers. For example, consider a DNN that is trained to identify cats. Assume the DNN contains multiple layers and that each layer contains 100 nodes. When the DNN acts on a cat image, the DNN layer closest to the input image is often most sensitive to sharp contrasts in the image at small scales (e.g., edges that are oriented in various directions). The next, deeper layer receives its input from the preceding one, and so may be sensitive to different patterns of edges. The nodes in this layer can be used to construct a 100-dimensional feature-vector space for such patterns in an example embodiment, and may be useful for characterizing general structures in images. Indeed, one or more feature-vector spaces derived from the layers may be used for characterization and the number of dimensions of each feature-vector space may vary. Each layer consumes the results from its shallower neighbor, and often progressing to deeper and deeper layers leads to more specificity in the types of patterns that can be represented. The deepest layers may be sensitive to rough shapes of cat faces with different orientations and their nodes would provide a way to represent and/or capture the morphology of having two eyes, a nose, and a mouth. The last, deepest layer is often used to convert a large-dimensional representation into a very simple one: a single value between zero and one that describes the likelihood that the image contains a cat. Again, each layer may provide a useful representation for some aspect of the target class to be labeled.

Proceeding to 420, the scene feature extractor and feature classifier system may determine a feature space for assignment to each feature type provided with respect to an object detected in a scene of interest. The scene feature extractor and feature classifier system may access a database of past feature instances 422 for a feature type. Each past instance of a feature type has an associated feature vector value that represents a vector value within a multidimensional space. As described previously, the feature vector nodes may be multi-dimensional values to reflect characteristics of the feature attribute that may help to define uniqueness in the feature attribute allowing for identification or association with a known object such as a person. Further, the past feature instances are labeled feature vectors indicating both previously observed feature attributes as well as the association of the feature vector value with the feature type, person or other object identity, object type, or other factors. The past feature instance data 422 may include data previously loaded into a feature vector space. Several feature vector value nodes may be associated with a feature space for each feature type related to past instances of that observed feature type.

A feature space may include data of known objects, including identities, and multidimensional feature vector values associated with a feature type represented by the feature space. The scene feature extractor and feature classifier system may preload a feature space with vector values for these previous instances of the observed feature type. Feature spaces may only be populated with feature attributes of objects with some minimum amount of resemblance to the observed instance of a feature attribute in some embodiments to reduce computational burden of assessing too many previously observed feature vector values from a data base. In other aspects, candidate objects may be a pre-defined group of objects for which analysis by the scene feature extractor and feature classifier system is desired.

The scene feature extractor and feature classifier system will determine a neighborhood of previously observed and labeled instances of a feature type within a feature space. Those multidimensional feature vector values in a feature space within a threshold value distance in one or more dimensions may be used to define the subset of previously observed and labeled feature vectors for a feature type that are within the neighborhood of the feature vector value for the currently-observed instance of an observed feature type. A distance relative to a multidimensional feature vector value between a currently observed instance and past instance feature vector values in a feature space is determined relative to a threshold multidimensional distance as determined by any of several methods. For example, a dot product of multidimensional values may be used to determine a distance between a currently-observed feature vector value and a plurality of previously observed and labeled feature vector values within a vector space. Nearness of the currently observed feature vector value to a labeled, previously-observed feature vector value may contribute to the weight given to that label being a correct identification of the current object of interest. Those previously observed and labeled feature vector values that fall within a threshold distance, whether a dot product or other determination of multidimensional distance, will be considered the neighborhood of the currently observed feature vector value for a feature type represented by the feature space. A number of feature vector values for labeled, previously-observed instances of a feature attribute found within a neighborhood of a currently observed feature vector value may also be used as weighting for label identification of currently observed object as similar to any candidate object.

Proceeding to 425, the scene feature extractor and feature classifier system will build one or more multi-feature graphs according to embodiments herein. An example multi-feature graph is shown in FIG. 5 according to an example embodiment. The multi-feature graph may include a plurality of feature types for which vectors are assigned that are associated with the same feature type observation. The feature vector nodes are shown in FIG. 5 within feature spaces. Association edges are used to label feature vectors, such as those within feature spaces, with known observations of an object such as a person. A feature vector node is determined for a subset of feature type. Its location is within a feature space for that feature type. For example, a full face view, right or left profile view, or other image view may be among several feature types. If the location of the determined feature vector node is within a threshold neighborhood distance, it is considered when determining the identity of an object such as a person. Previously-observed instances of an object similar to the currently-observed object is considered in the feature graph for a feature type observed in the scene including the currently-observed object. The association edge between a previously-observed feature vector node is linked to a previously-observed instance of a known candidate object for evaluation relative to the currently observed feature vector node for that feature type.

At 430, the scene feature extractor and feature classifier system may link a plurality of feature graphs and take the union of these feature graphs to establish a multi-feature graph. With this multi-feature graph, a likelihood that one or more labels apply to the currently observed object may be assessed for the current scene observation of that object. Application of a probabilistic graph modeling algorithm may be used to assess the likelihood levels that the one or more labels may apply to the currently observed object. For example, in the multi-feature graph shown in FIG. 5, the probabilistic graph modeling algorithm may assess whether the full face view feature vector node 520 of a person of interest 510 may be labeled as a full face view of "Harry" 504 or "Sam" 506 along association edge 519 including a likelihood level for each. Similarly, the probabilistic graph modeling algorithm may also assess whether the left-profile view feature vector node 516 or the voice signature vector node 518 of a person of interest 510 may be labeled as associated with "Harry" 504 or "Sam" 506. This assessment may be made with respect to the multi-feature graph in the present instance and also used in a wider semantic scene graph of a scene of interest integrating a plurality of multi-feature graphs and feature vector spaces in various embodiments. The wider integration into a semantic scene graph of a scene of interest is discussed further herein.

Turning to FIG. 5, a few loaded, multi-dimensional feature spaces 540, 550, and 560 are shown for an object such as a person to be identified (e.g., 304 in FIG. 3) from a visual scene of interest. For example, the multiple feature graph of FIG. 5 may be partially used to assess an instance of observation of a person 510 in a visual scene of interest for a determination of the identity of the person observed at 510 either "Harry" 504 or "Sam" 506. A current instance observation of a visual scene of interest may include a person of interest in the scene (e.g., 304 in FIG. 3). That current instance of observation may be depicted in the multiple feature graph 500 as current observation node 510. The association edges 512 and 514 reflect a likelihood based on the multiple feature graph 500 for the person of interest being either Harry 504 or Sam 506. Additional factors in determining the likelihood assigned to association edges 512 and 514 include the possibility that the currently observed instance of the person of interest 510 is "Harry" 504 or "Sam" 506 also come from the wider semantic scene graph as described further herein. The additional factors may include association edges with other objects (including other persons), locations, and additional aspects of the wider semantic scene graph which influence the determination of whether the person of interest in the current observed instance 510 has a higher likelihood of being "Harry" 504 or "Sam" 506.

In the example of FIG. 5, previous instances of observations of "Harry" 504 or "Sam" 506 are also shown within the multiple feature graph for the person of interest in the current observation. Past observation nodes S1 530, S2 532, and S3 534 are past observation instances of "Sam" 506. Past observation nodes H1 536 and H2 538 are past observation instances of "Harry" 506. Feature spaces 540, 550, and 560 may be preloaded with multidimensional feature vector values as shown by the squares representing the feature vector nodes in the feature spaces.

For example, full-face feature space 540, also referred to as frontal view feature space herein, contains several pre-loaded instances of previously-observed and labeled occurrences of the feature type for full-face view of an object including labeled feature vector nodes 542-546 within neighborhood 548, and those feature vector nodes 547 outside of neighborhood 548. Neighborhood 548 is determined relative to star 520 which represents the currently observed full-face feature vector value for the currently observed object. In particular, feature vector value 520 is associated with the currently observed person 510 shown in the embodiment of FIG. 5. Association edge 519 links the currently observed full-face feature vector value 520 with currently observed instance of a person 510 in the scene of interest. Association edge 519 indicates that the currently observed person 510 has the feature of a full-face image with a feature vector value 520 within feature space 540.

Pre-loaded, previously-observed and labeled feature vector values include vector values 542-547 in feature space 540. Labeled feature vector values 542-546 are considered when identifying currently observed person 510. However, since previously-observed and labeled feature vector values 547 are outside the neighborhood 548, they are not considered. A previous observation of "Harry" 304 at H1 536 includes a previously-observed, full-face image of "Harry" which was labeled as such. The previously observed feature vector value 543 is labeled for "Harry" and represented by the association edge shown between 543 and the previous observation of "Harry" at H1 536. It is noted that the previous observation of Harry at H1 536 did not include another observed feature attribute. Thus, only vector node 543 in vector space 540 that is associated and labeled with the first past observation of Harry at H1 536 is considered when assessing the likelihood that currently observed person 510 is "Harry" 504.

Previously-observed feature vector value 542 is labeled for a second previous observation of Harry at H2 538. The second previous observation H2 538 of Harry 504 included a full-face image and the feature vector value 542 is determined for that observation instance. An association edge between the feature vector value 542 and H2 538 is shown indicating a labeled existence relationship between the observed full-face feature vector node instance 542 and previous observation H2 538 associated with Harry 504. Further, feature vector value 542 for the second observation instance of H2 538 also falls within the neighborhood 548 within feature space 540 for full-face images of a person.

Additionally, the second, previous observation instance of Harry at H2 538 also had a left-profile image and a voice signature with the instance of observation H2 538 of Harry 504. An association edge is shown between H2 538 and feature vector node 554 within the left-profile image feature space 550. Another association edge is shown between H2 538 and feature vector node 566 within voice signature feature space 560. Feature vector node 554 is within neighborhood 552 of currently observed left-profile feature vector space 516 in feature space 550. Feature vector node 566 is within neighborhood 564 of currently observed voice signature feature vector value 518 in feature space 560. Thus, feature vector nodes in all three vector spaces 540, 550, and 560 that are associated and labeled with the second past observation of Harry at H2 538 are considered when assessing the likelihood that currently observed person 510 is "Harry" 504.

There are several previous observation occurrences of another candidate person Sam 306 according to an embodiment of the present disclosure. Three previous observations of Sam S1 530, S2 532, and S3 534 are available for consideration by the scene feature extractor and feature classifier system. The first previous observation S1 530 of Sam 506 includes a full-face image and is represented with the feature vector value 544 for that observation instance in feature space 540 for full-face images. Previously-observed feature vector value 544 is labeled for the first previous observation of Sam at S1 530 which is depicted via the association edge between the feature vector value 544 and S1 530. The association vector indicates a labeled existence of the relationship between the full-face feature vector node instance 544 and the previous observation S1 530 for Sam. Further, feature vector value 544 also falls within the neighborhood 548 of the currently-observed feature vector value 520 of a person of interest 510.

Additionally, the previous observation instance of Sam at S1 530 also had a left-profile feature vector value 575 and a voice signature feature vector value 565. An association edge between S1 530 and feature vector node 575 and S1 530 and feature vector node 565 indicates those feature vector nodes are labeled with the previous observation of Sam at S1 530. Feature vector node 575 is within neighborhood 552 of currently observed left-profile feature vector space 516 in feature space 550. Feature vector node 565 is within neighborhood 564 of currently observed voice signature feature vector value 518 in feature space 560. Thus, vector nodes in all three vector spaces 540, 550, and 560 that are associated and labeled with the first past observation of Sam at S1 530 are considered when assessing the likelihood that currently observed person 510 is "Sam" 506.

The second previous observation S2 532 of Sam 506 also includes a full-face image and is represented with the feature vector value 545 for that observation instance in feature space 540 for full-face images according to an embodiment. Previously-observed feature vector value 545 is labeled as existing for a second previous observation of Sam at S2 532 as indicated by an association edge between the feature vector value 545 and the previous observation S2 532 for Sam. Feature vector value 545 also falls within the neighborhood 548 of the currently-observed feature vector value 520 of a person of interest 510.

Further observation feature types for previous observation instance of Sam at S2 532 also includes a left-profile feature vector value 557 and a voice signature feature vector value 565. Association edges between S2 532 and feature vector node 556 and S2 532 and feature vector node 563 indicated those feature vector nodes are labeled with the previous observation of Sam at S2 532. Feature vector node 557 is within neighborhood 552 of currently observed left-profile feature vector space 516 in feature space 550. Feature vector node 563 is within neighborhood 564 of currently observed voice signature feature vector value 518 in feature space 560.

The third previous observation S3 534 of Sam 506 also includes a full-face image and is represented with the feature vector value 546 for that observation instance in feature space 540 for full-face images according to another aspect. Previously-observed feature vector value 546 is labeled as existing for a second previous observation of Sam at S3 534 as indicated by an association edge between the feature vector value 546 and the previous observation S3 534 for Sam. Feature vector value 546 also falls within the neighborhood 548 of the currently-observed feature vector value 520 of a person of interest 510.

Further observation feature types for previous observation instance of Sam at S3 534 also includes a left-profile feature vector value 555 and a voice signature feature vector value 562. Association edges between S3 534 and feature vector node 555 and S3 534 and feature vector node 562 indicated those feature vector nodes are labeled with the previous observation of Sam at S3 534. Feature vector node 556 is within neighborhood 552 of currently observed left-profile feature vector space 516 in feature space 550. Feature vector node 562 is within neighborhood 564 of currently observed voice signature feature vector value 518 in feature space 560.

As can be seen in the multiple feature graph of FIG. 5, vector nodes in all three vector spaces 540, 550, and 560 are associated and labeled with the three past observations of Sam at S1 530, S2 532, and S3 534. The vector nodes from these past observations are considered when assessing the likelihood that currently observed person 510 is "Sam" 506. Further, the weight of the number of past observations of Sam S1 530, S2 532, and S3 534 is greater for each of the shown vector spaces 540, 550, and 560 by virtue of the larger number of vector nodes within neighborhoods of the current observations of person 510 as compared to past instances of Harry. However, closeness of the past-observed vector nodes to a present observation within the feature spaces 540, 550, and 560 also factors into the determination of identifying the person of interest 510. It can be appreciated that a plurality of additional feature spaces may be part of the observation of a scene and observation vector nodes determined for objects such as person of interest 510. For example, a right profile feature space, heat signature feature space, posture identification feature space, color or hue feature space, or other feature space aspects may be included in observations of a scene of interest.

Returning to 430 of FIG. 4, the multiple feature graph is built and a probablistic graph algorithm is applied to the association edges as well as the feature spaces to determine a likelihood that one or more labels apply to the new observation. For example, whether the current observed instance of a person 510 in the visual scene of interest may be labeled with an identity of either "Harry" 504 or "Sam" 506. Closeness of those feature vector values to past instances of feature vector values may be used as a metric for determination via probabilistic modeling of the likelihood levels that a label should be applied to a currently observed instance. For example, a label applied to any association edge such as 515, 517, or 519 in the example embodiment of FIG. 5 may associate the currently observed person 510 as either candidate person 504 or 506 for each feature vector node instance of observation. The collection of association edges and likelihood that labels apply for a plurality of feature types observed lends to an overall identification likelihood or label association of the observed object within the multi-feature graph generated. For example, the scene feature extractor and feature classifier system may be used to build a multi-feature graph and apply probabilistic graph algorithm assessment of that multi-feature graph to assess likelihood of individual association edges for feature types as well as an overall likelihood that person 510 should be labeled at 312 as "Harry" 304 or at 314 as "Sam" 306. Overall likelihood assessment of "Harry" at 312 or "Sam" at 314 may also be influenced by probabilistic assessment of the wider semantic scene graph discussed further herein. In other words, additional attributes including some features, contextual information, and other semantic scene associations and label likelihoods applied to the currently observed scene will also impact the overall likelihood of a label applied to an instance of observation of an object such as person of interest 510 in FIG. 5 in some embodiments.

In an example embodiment, probabilistic graphical models (PGM's) are used to provide a framework for encoding probability distributions over graphs, which are themselves made up of groups of nodes connected by edges. For the purposes of discussion, a simplified way to view PGM's is described as representing objects and their relations to one another, with the additional feature that certain aspects of the objects (nodes) and relations (edges) can be further represented by likelihoods or beliefs relating to hypotheses about the objects or relations that interact with each other in a way that respects the graph's structure. One goal of PGM's is to provide a framework for determining these likelihoods or beliefs in case their values are initially unknown for parts of the graph. For example, the likelihood might characterize the state of an object (e.g., whether its label corresponds to "Sam" or "Harry") or the state of an edge (e.g., the likelihood that the subject-predicate-object "Sam Is-Near-Location Chicago" is valid). In many cases, PGM algorithms apply mathematical rules to relate the likelihoods observed at nodes that are connected by a shared edge. Both Bayes Theory and Dempster-Shafer Theory provide algorithms to evaluate the joint likelihood that arises when two or more nodes are connected by shared edges. For example, Bayesian methods focus on the probability values, while Dempster-Shafer methods focus on belief and conflicting evidence in various example embodiments. Finally, given a subset of nodes whose states are assumed known (or have estimated likelihoods), these PGM algorithms may utilize one or more iterative techniques to progressively determine (or converge on estimates of) the likelihoods of the states of nodes that were initially unknown. In this way, PGM's utilize the graph network's structure to characterize (by virtue of constraint) how the likelihoods for various nodes must be related. Applying the PGM's to complex semantic graph networks then provides a powerful framework of modeling real-world scenarios with high-performance computers in the various embodiments described herein.

In a further aspect, probabilistic inference is used to make assessments for an overall semantic graph network or any portions of the semantic graph network for behavioral prediction of a captured scene or series of captured scenes for example. Probabilistic inference includes an important category of probabilistic graph algorithms that seek to evaluate the likelihood of a graph's state (which consists of the states of all a graph's nodes and edges) when one or more of the states of its nodes' and edges' are presumed fixed or only allowed to vary within some pre-defined range. For the purposes of discussion, a simplified way to describe a graph's state is as a particular combination of the nodes' and edges' potential states, and the graph itself can be characterized by the set of all of these potential graph states. Since one or more PGM algorithms may be used to jointly estimate the likelihoods of nodes' and edges' states (in case they are initially unknown), the PGM algorithms can also be viewed as assigning an overall likelihood to each graph state. Similarly, probabilistic inference may be used to evaluate on the likelihoods associated with one or more portions of the graph. For example, one part of the graph may characterize certain aspects of the captured scene or scenes that may be of particular interest in evaluating the likelihood of an occurrence within the scene. In most cases, iterative PGM techniques are used in example embodiments to progressively refine the likelihoods or belief values over the full graph, first starting from the graph's initial state (with one or more object/edge states assumed known) and ending with its final state (where values for all the states are populated). Then the graph's overall likelihood may be taken to be a "best guess" prediction concerning the scene. Examples of the above are described in various embodiments herein. For example, assessment of PGMs for semantic scene graph networks is described with respect to FIGS. 5 and 6 herein.

At 435, the scene feature extractor and feature classifier system integrates the multi-feature graph generated by the scene feature extractor and feature classifier system into a wider semantic scene graph. The scene feature extractor and feature classifier system may further apply the probabilistic graph algorithm to determine overall likelihoods of values assigned to attribute labels for each instance of observation of an object within the scene of interest. This may include labels or identities attributed to persons or other objects as well as edge associations between objects within the scene of interest. Additional edge associations within the semantic scene graph may include indications of relationships between objects, location identification for objects, and other contextual aspects and attributes related to the scene or the objects observed within the scene of interest. Such data for contextual aspects and attributes relating to objects within the scene of interest may be drawn from a scene feature extractor and feature classifier system database 437. The scene feature extractor and feature classifier system database 437 which may include previous semantic scene graphs for individual objects within the current scene of interest or for particular location of the current scene of interest. Object may include persons, vehicles, buildings, weapons, luggage, or any other objects of interest identified within a scene. Details of known or expected relationships between objects, such as individuals, may be obtained from previous semantic scene graphs for instances of scene observations as well as from contextual data including access to social networking data, previously recorded data about known relationships, or the like.

At 435, upon integrating the multi-factor semantic scene graph with likelihoods of attribute values applied to nodes and edges for identities and relationships estimations, the multi-factor semantic scene graph, such as all or portions of that shown in FIG. 5, may be output by the information handling system for assessment by a user. For example, a graphical depiction may be provided to a user via a display device or may be transmitted to a user at a remote location for viewing via a display device on another information handling system. In other aspects, the scene feature extractor and feature classifier system according to embodiments herein may be queried as to particular nodes or edges to determine options for objects (e.g., particular nodes) observed in a captured visual scene, relationships (e.g., one or more edges) within the visual scene or additional overall assessments from multiple layers that may comprise one or more integrated multi-factor semantic scene graphs. An output may be provided by the scene feature extractor and feature classifier system according to various output devices herein including visual outputs via a display device, transmission of responses to authorized users querying via remote information handling systems, and via audio output such as alarms or voice generated outputs. It is understood that any or several digital output indications of one or more aspects of the multi-factor semantic scene graph or graphs determined for a visual scene may be provided by the scene feature extractor and feature classifier system according to various embodiments. It is understood that the determinations of a multi-factor, semantic scene graph integrated with other semantic scene graphs and values for nodes and edges within those graphs generated accordingly may be utilized or output in a variety of ways for particular system operation of scene feature extractor and feature classifier system according to various embodiments herein. At this point the process of FIG. 4 may end.

The multi-factor graph of FIG. 5 is but one example multi-factor graph that may be generated by the scene feature extractor and feature classifier system according to embodiments herein. It is understood that the multi-factor graph including the identified nodes, feature vector nodes, previous instances of potential objects observed, feature spaces, feature space neighborhoods, generated likelihood values, and association edges may be generated in a plurality of variations on graph structure and with any number of nodes, association edges, feature spaces, previously observed instance nodes, feature vector values, or other aspects related to one or more objects or sub-components observed in a visual scene of interest. The multi-factor graph of FIG. 5 is simplified to one observed person with only two potential candidates and multi-factor graph detail is omitted or summarized in parts. It is understood that the multi-factor graph such as FIG. 5 may be integrated into a greater semantic scene graph with a large number of objects, sub-components, attribute nodes, and feature vector types with respect to observations of visual scenes of interest in accordance with embodiments herein. It is contemplated that a plurality of multi-factor graphs may be generated by the scene feature extractor and feature classifier system. Such a plurality of multi-factor graphs may be integrated and used with the wider semantic scene graph to estimate or predict behavior of objects within an observed scene of interest. All values shown in FIG. 5 are example data points and it is understood that the scene feature extractor and feature classifier system may generate data for likelihood levels and feature vector distances according to execution of algorithms or customized variations of algorithms described in embodiments herein. Values in FIG. 5 example values for explanatory purposes only.

Figure 6:
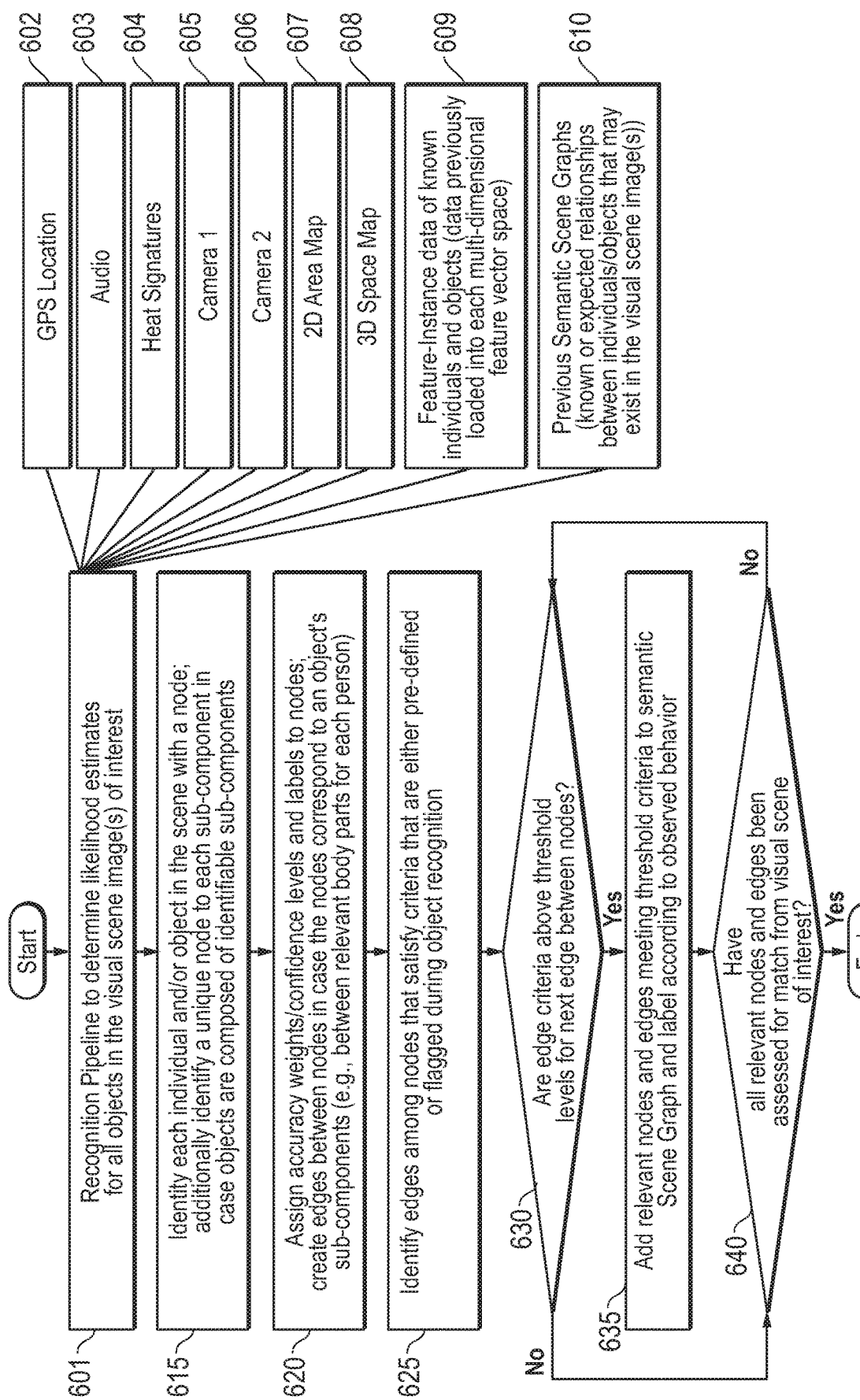
FIG. 6 is flow diagram illustrating a method of establishing semantic associations for multi-feature graphs and integrated object feature spaces to estimate semantic behaviors within at least one captured visual scene according to an embodiment of the present disclosure.
Figure 7:
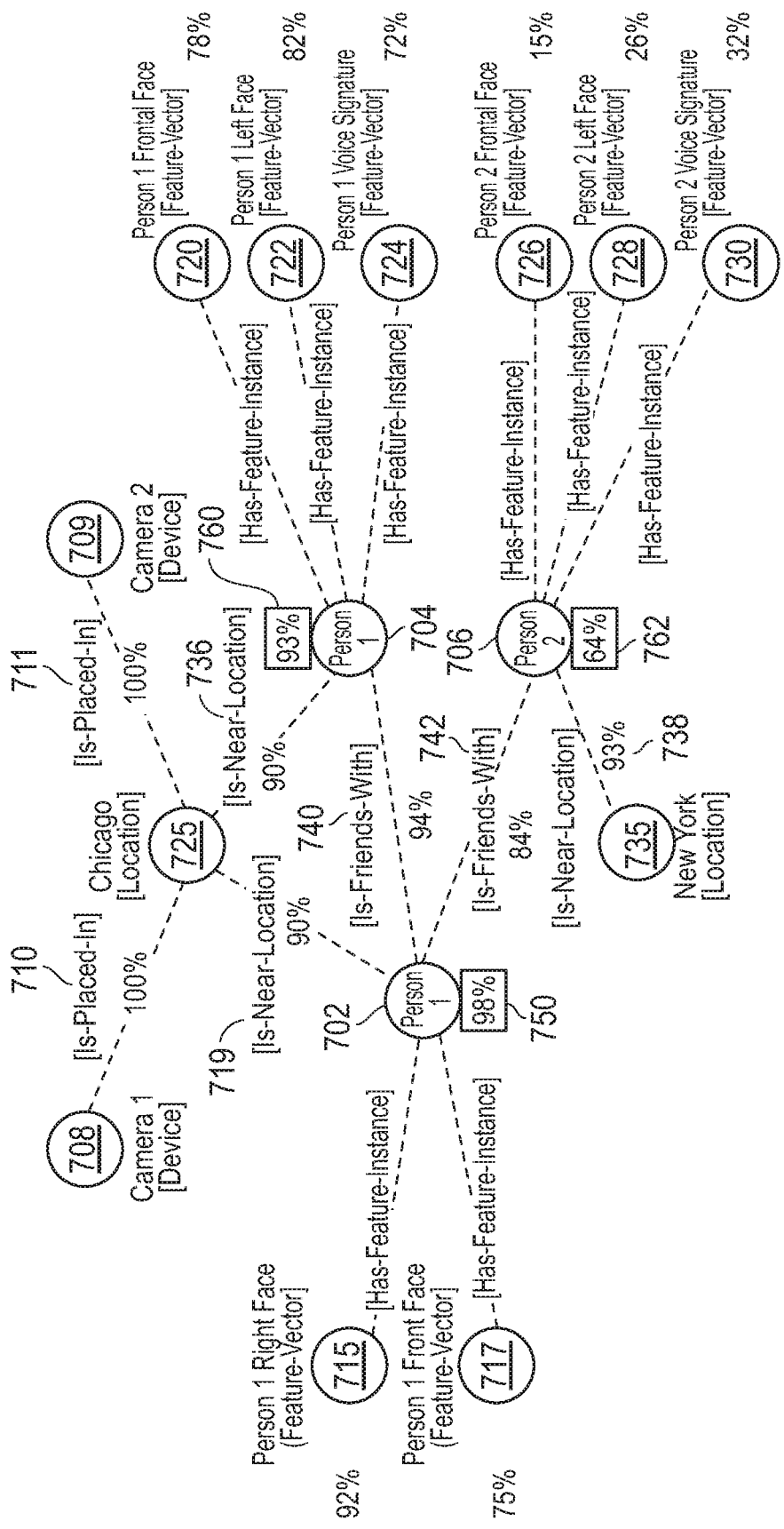
FIG. 7 is a graphic diagram illustrating a semantic scene graph with integrated multi-feature graphs including vector nodes and association edges as determined by a scene feature extractor and feature classifier system according to an embodiment of the present disclosure.

With regard to further details for generating a wider semantic scene graph, additional discussion is provided in FIGS. 6 and 7. FIG. 6 is a flow diagram illustrating operation of the scene feature extractor and feature classifier system to generate a semantic scene graph according to an embodiment of the present disclosure. At 601, recognition pipeline operations for a plurality of objects within a visual scene of interest may generate a plurality of multiple feature graphs. An example embodiment of a multiple feature graph for an observed instance of one person in a visual scene of interest is described in one example embodiment with respect to FIG. 4 and FIG. 5 above. The recognition pipeline operation of the scene feature extractor and feature classifier system may be applied to all objects recognized within a visual scene of interest. Likelihood estimates are made via generation of multi-feature graphs for the objects that include likelihood identification of those objects. For current observations of one or more objects within the visual scene of interest, many observation systems may be utilized to obtain data about the objects with respect to various feature types. For example, a GPS location 602 may be obtained for sensors or actuators such as microphones, IR cameras, visible light cameras, and other observation data acquisition systems. GPS location 602 may be established as a separate attribute or node of the visual scene of interest for the semantic scene graph.

In another example, audio data 603 may be obtained from one or more microphones to establish a sound signature feature vector node and feature space for an observation of an object. For example, if an object is an observed instance of a person then a voice-signature feature vector node and feature space may be established for a multi-feature graph for that person. In another example embodiment, if an object is an observed instance of a vehicle then a sound-signature feature vector node and feature space, such as an engine noise, may be established for a multi-feature graph for that vehicle.

Heat signature data 604 may be collected from one or more IR camera systems. The IR camera system data may be used to establish a heat-signature feature vector node and feature space for one or more objects observed in a visual scene of interest. The heat-signature feature vector node and feature space may be utilized as part of a multi-feature graph in accordance with embodiments herein.

Visual image data 605 and 606 from a plurality of camera systems may also be obtained for a visual scene of interest during an observation instance. This may yield one or more perspective view feature vector nodes and feature spaces for the one or more objects observed in a visual scene of interest. The view perspective feature vector nodes and feature spaces may also be utilized as part of a multi-feature graph in accordance with embodiments herein.

With a particular location identified for a visual scene of interest, additional contextual information may be accessed for the location. For example, two dimensional area map information 607 or three dimensional area map information 608 for a GPS location may be accessed. This data may be utilized to determine more granular location attribute information with respect to objects within a visual scene of interest including feature types such as identification of buildings, rooms, or other structures within a visual scene of interest.

The scene feature extractor and feature classifier system may further access feature instance data for feature types 609 from a scene feature extractor and feature classifier system database. The feature instance data 609 is used to compare feature vector nodes for previous observations of a feature type with a currently observed feature vector node as described above. Additional data from a scene feature extractor and feature classifier system data base for several feature spaces with respect to objects, such as individuals, may be accessed when the recognition pipeline builds multi-dimensional feature spaces for various feature types related to objects observed. In this way, the recognition pipeline may build multi-feature graphs for one or more currently-observed objects within a scene of interest. The multi-feature graph may be used with association edges and feature vector node values to estimate likelihood of a label applying to an observation of an object in the currently observed scene of interest.

Additionally, previous semantic scene graphs accessed for previously observed visual scenes 610, including one or more currently observed objects, may be accessed via a scene feature extractor and feature classifier system database. Previous semantic scene graphs 610 may indicate known or expected relationships or affinities among objects, such as persons, that are candidates to be labeled or identify currently observed objects in the scene of interest. These relationships may also be discerned from access to contextual data such as social media context or intelligence data bases in other aspects. With the relationships or affinities identified, association edges between currently observed objects or attributes such as locations within the wider semantic scene graph may be developed. These relationship edges between currently observed objects or attributes of a visual scene may further contribute to determination of likelihood of a label or a plurality of labels applying within a multi-feature graph for an object that was built by the recognition pipeline. Relationship association edges may also be referred to as affinity association edges in various embodiments herein.

Proceeding to 615, the scene feature extractor and feature classifier system may begin to build the wider semantic scene graph integrating a plurality of multi-feature graphs for objects observed in a visual scene of interest. The recognition pipeline may identify various observed objects of interest as described above. For each object, such as each individual person, the scene feature extractor and feature classifier system will assign a observation instance node. For each observation instance node, several candidate identities of an object may be assigned nodes relative to an observed instance of an object. For example, a node may be assigned for "Sam" as well as "Harry" when nodes for an instance of an object are assigned within the semantic scene graph.

In another aspect, identified objects observed in a current instance of a visual scene may include sub-component objects. In some cases these sub-components of a base object observed in a visual scene may have their own object nodes, or sub-component nodes assigned and associated with the base object within a semantic scene graph. For example, if an observed base object is a person, a sub-component may include an object such as a weapon or a vehicle with which the person is observed. In other aspects, observation of sub-components may include, for example, body parts of a person or components of a vehicle, building, or other object that are part of the observed object. Identification of position, orientation, and action may be made of the sub-components relative to a base object.

These sub-components may be included as part of a multi-feature graph for the base observed object to assist in identification labeling of the base observed object in some embodiments. In other embodiments, sub-component nodes may have their own multi-feature graphs associated with identifying or labeling aspects of the sub-component. It is appreciated that these multi-feature graphs may be generated according to embodiments similar to the above for base observed objects and sub-components. The scene feature extractor and feature classifier system may generate a combined multi-feature graph for the base object and sub-components as well as individual multi-feature graphs for sub-components in some embodiments. For example, a base observed object may be a person in a visual scene of interest and a sub-component may be a vehicle with which or in which the person is observed. A multi-feature graph analysis of the vehicle may identify the vehicle as a type associated with or owned by one of the candidates considered for labeling the observed person. Thus, a multi-feature graph may be generated to identify the vehicle such as make, model, color, etc. as well as integrated into a multi-feature graph for verifying labels of the person observed from among one or more potential candidates.

Flow may proceed to 620 where the scene feature extractor and feature classifier system may determine accuracy weights or confidences to labels assigned to nodes throughout the semantic scene graph. The accuracy weighting or confidence level determination may include assessments of the individual object node multi-feature graphs for the observed objects and sub-components as well as the association edge relationships to other object nodes, sub-component nodes, and attribute nodes associated with the observed visual scene. For a given object node, one or more candidate object nodes may be included within the semantic scene graph and thus one or more candidate objects may be considered for labeling the observed object of unknown identity during analysis by the scene feature extractor and feature classifier system. Further association edges with assigned accuracy weights or confidences for the labels that those association edges represent may be generated. For example, association edges may be generated between objects observed within a visual scene of interest. In another aspect, association edges may be generated between a base observed object node and observed sub-component nodes. For example, an association edge may be generated between two observed persons or candidates for observed persons with a label having confidence levels for "knows," "is friends with," "is related to," "is a spouse of," "works with," or other potential relationship labels.

In another example, a sub-component node may have an association edge assigned with a base object node to indicate "Sam's arm" or "Harry's arm" or even a location of the arm relative to the base object. For example, a sub-component node for a person's arm may include an object node for a person or candidate persons for an instance of an observed person. The person's arm may be associated with another sub-component node and the person's node. In an example, the person's arm may be linked to a jacket and a person or candidate persons with a potential label that the person's arm is in their jacket. Probabilistic graph modeling algorithm may be used to assign weights and confidences to both nodes and association edges as described above. Other examples include in various embodiments: building a graph-network representation of a car and its sub-components based on multiple observations of vehicles (labeled as "cars") that have four wheels, two or four side doors, etc., and that people who are observed to be carrying firearms in public might be classified as either police officers (if they are in wearing a uniform) or potential threats. In case the sub-components' weights and confidences lead to an indication of "threat" with high confidence, the scene feature extractor and feature classifier system described herein may itself perform further analysis and/or alert its users to take action in some embodiments.

Proceeding to 625, the scene feature extractor and feature classifier system may apply criteria for identifying and selecting edges between nodes representing observed objects within the visual scene of interest. Several objects having assigned object nodes within the semantic scene graph may have been pre-defined or flagged during object recognition in the recognition pipeline as objects of interest in some embodiments. Selecting edges between these object nodes for assessment via the semantic scene graph depends on meeting any of several criteria for analysis. The criteria for edge selection allows for selection or labeling association edges between object nodes for observed behaviors including association or meeting of the objects, such as individuals. Several types of criteria may be relevant to determining identity or behavior via the semantic scene graph of objects or activity within an observed visual scene. For example, relevant criteria may include application of thresholds for inter-object physical proximity to the extent it can be discerned. In other aspects, thresholds of affinity or other association may be applied to identify nodes and edges of particular interest. For example, assessment of scene feature extractor and feature classifier system databases for previous meetings of persons or associations of objects may meet a criteria of frequency or number of instances observed. In another example, an audio recording a voice or communication exchange of sufficient duration to indicate a conversation may meet a criteria threshold.

The scene feature extractor and feature classifier system makes use of an ontology that contains a managed accounting of the kinds of relationships that may exist between objects that can be distinguished (via detection and classification) by the system. In an aspect, an ontology may be described as an abstraction of a presumption about an observed object node or edges describing relationships between objects. The ontology relates to a base assumption that some objects may be people or other specific things such as vehicles, weapons, buildings, etc. in some embodiments. The ontology further relates to underlying abstractions of various specificity about edge relationships between object nodes such as people may be acquainted, be friends, be married, live somewhere specific, use a vehicle, own a vehicle, use a weapon, own a weapon, have a house or business, or other relationship abstractions assigned to edges between nodes in various example aspects. The ontology of a semantic scene graph for a captured scene or scenes underlies the concrete instances of observation data for a node class of person or other object as well as for a class of edge describing relationships between nodes.

In one approach, a "core" ontology may be initialized with only a small number of possible object types (e.g., person, body part, vehicle) and possible relationships (varying degrees of spatial and temporal proximity to represent juxtaposition and enable sequencing of cause and effect within events that have some duration) in an example embodiment. In another embodiment, an ontology may be defined using relationships that are defined in terms of hierarchies of constraints on a given core ontology (e.g., defining "Is-Friends-With" as a relationship between people that demands a particular kind of interaction and persists over some duration of time).

In an example embodiment, the scene feature extractor and feature classifier system is used to provide highly accurate identification of persons-of-interest in crowds and public spaces. In this example, the system utilizes (1) one or more fixed or mobile cameras (whose fields of view fully or partially cover the area of interest, (2) one DNN to identify whether an object in the field of view is a person, (3) another DNN to characterize each person's facial features when possible, and (4) a semantic graph whose ontology includes details about the feature vector spaces corresponding to facial features, as well as each person's first and last name, last known address, visa status, known associates and family members, as well as other attributes that may indicate whether the person is likely to be considered a threat to the community. The semantic graph is pre-loaded with information from various sources. The scene feature extractor and feature classifier system is then used to determine facial features for each person and a semantic scene graph consisting of nodes for each person observed in the crowd. For simplicity, it is assumed that the association edges between the nodes in the semantic scene graph describe one particular type of affinity label that is based solely on proximity and orientation: two nodes are connected by an edge if the corresponding people in the scene are standing side-by-side and separated by at most two feet to the left or right. In most recognition systems, the likelihood of an identification is based on a targeted individual's facial features, ignoring visual and semantic context. The scene feature extractor and feature classifier system described herein would instead jointly estimate the likelihood of an identification of a targeted individual using both facial recognition and, for example, whether the individual is expected to be present in cameras' location at the current time, whether individuals standing next to the targeted individual are known associates or family members (as characterized by the semantic scene graph), and might further preferentially weight potential identifications for individuals that are considered threats to the community (which in turn might be used to alert law enforcement to investigate further).

Proceeding to 630, a potential edge between two observed object nodes is assessed for a selected criteria relevant to predicting an observed behavior of the objects within a visual scene. Two object nodes are selected and a potential edge between the object is assessed for inter-object physical proximity, affinity, conversation, or other association criteria. A value of the proximity, affinity, conversation level, is determined for the potential association edge relative to a threshold level for each criteria. If no edge criteria thresholds are met between two or more observed objects at 630, flow proceeds to 640 to assess whether all pairs or sets of observed objects have been considered for edge criteria threshold levels.

If a threshold criteria level of association is met for one or more criteria between two object nodes at 630, then flow proceeds to 635. Association edges meeting the one or more threshold criteria are generated between the two object nodes as part of generating the semantic scene graph. FIG. 7 shows an example of a generated semantic scene graph according to an embodiment of the present disclosure. For example, if an observed object "Jim" 702 with a likelihood of 98% is within a criteria threshold of another observed person who is either "Sam" 704 or "Harry" 706, then association edges are generated for the semantic scene graph. Association edge 740 is shown between node "Jim" 702 and "Sam" 704 relating to an affinity between the two identify a friendship. The friendship affinity criteria is assessed at 94%. Another association edge 742 is generated between "Sam" 704 and "Harry" 706 as shown in FIG. 7 for a friendship affinity criteria with a association criteria likelihood value of 84%. The criteria for selecting an attempt at identifying a person of interest who is either "Sam" 704 or "Harry" 706 may have been a basis for selecting nodes relative to "Jim" 702 due to another criteria in other embodiments (not shown). For example, physical proximity of "Jim" 702 to another person in the scene or an ongoing recorded conversation between "Jim" 702 and the unknown second person of interest may have been used as a criteria to assess an association level between "Jim" 702 and identify this other person of interest. Further details of semantic scene graph in FIG. 7 are discussed below.

Proceeding to 640, the scene feature extractor and feature classifier system may continue to generate a semantic scene graph. The scene feature extractor and feature classifier system determines whether all flagged or pre-defined object nodes or other attribute nodes (such as location) have been assessed for edges meeting threshold association criteria levels from the visual scene of interest. If not, flow returns to 630 to assess the next edge between semantic scene graph nodes for one or more association edge criteria as described above. Those meeting association edge criteria threshold levels may then have association edges added between semantic scene graph object or other attribute nodes further generating detail in the semantic scene graph for analysis of behavior observed in a visual scene of interest.

If no association edges between additional relevant nodes are left for determination, then the process may end and the semantic scene graph may be generated. Probabilistic graph modeling algorithms may be applied to the overall semantic scene graph to determine label likelihood levels for object nodes or for association edge criteria likelihood levels that relate to an observed behavior. For example, returning to FIG. 7, the overall likelihood that the person of interest observed with "Jim" 702 is "Sam" 704 may be set at 93% 760. This overall likelihood of 93% 760 may be derived from the multi-feature graph generated for the second person of interest and including consideration of "Sam" 704 as well as the association edge 740 between "Sam" 704 and "Jim" 702 and the association edge 736 between "Sam" 704 and a location attribute node for Chicago 725. The likelihood levels attributed to "Jim" 702 at 98% and to Chicago 725 at 100% further contribute to the overall likelihood at 93% 760 that the second observed person is "Sam" 704. The Chicago location 725 is 100% due to Chicago's association edges 710 and 711 indicating that camera 1 node 708 and camera 2 node 709 are known to be located in Chicago. The association edge 736 between "Sam" 704 and Chicago 725 may be at 90% due to contextual factors, previous semantic scene observations, or other available data assessed with respect to "Sam" 704.

Upon the scene feature extractor and feature classifier system determining that the flagged or pre-defined object nodes or other attribute nodes (such as location) have been assessed for edges meeting threshold association criteria levels from the visual scene of interest at 640, and upon integrating the multi-factor semantic scene graph with likelihoods of attribute values applied to nodes and edges for identities and relationships estimations, the multi-factor semantic scene graph, such as all or portions of that shown in FIG. 7, may be output by the information handling system for assessment by a user. It is understood that any or several digital output indications of one or more aspects of the multi-factor semantic scene graph or graphs determined for a visual scene may be provided by the scene feature extractor and feature classifier system according to various embodiments. For example, a graphical depiction of some or all of the multi-factor semantic graph or graphs for the visual scene of interest may be displayed or searchable to a user via a display device or may be transmitted to a user at a remote location for viewing via a display device on another information handling system. In other aspects, the scene feature extractor and feature classifier system according to embodiments herein may be queried as to particular nodes or edges to determine options for objects (e.g., particular nodes) observed in a captured visual scene, relationships (e.g., one or more edges) within the visual scene or additional overall assessments from multiple layers that may comprise one or more integrated multi-factor semantic scene graphs. An output may be provided by the scene feature extractor and feature classifier system according to various output devices herein including visual outputs of queried values or probabilities via a display device, transmission of responses to authorized users querying via remote information handling systems, via audio output such as alarms and voice generated outputs or other digital output responses provided according to embodiments herein. It is understood that the determinations of a multi-factor, semantic scene graph integrated with other semantic scene graphs and values for nodes and edges within those graphs generated accordingly may be utilized or output in a variety of ways for particular system operation of scene feature extractor and feature classifier system according to various embodiments herein.

As shown in FIG. 6 and in FIG. 7, a semantic scene graph may be generated to link a plurality of multiple feature graphs for several objects or other aspects of an instance of an observed scene of interest. The semantic scene graph may link known relationships between observed objects within the visual scene of interest as well as utilizing the data known about one or more feature instances observed for the objects. The semantic scene graph may be used to predict or understand behaviors such as associations observed in an instance of a captured visual scene of interest and provide weights or confidence levels in verifying labels that reflect predicted behaviors. For example, an association between two observed people may be predicted behavior of the observed scene of interest according to an embodiment. An association between a person and another object of interest such as a weapon or vehicle may also lend to predicted behavior for a currently observed scene of interest in other embodiments.

FIG. 7 is a graphic diagram illustrating a semantic scene graph according to an embodiment of the present disclosure. As described, the scene feature extractor and feature classifier system may generate a semantic scene graph such as one shown in FIG. 7. The scene feature extractor and feature classifier system may operate a recognition pipeline to establish one or more multi-feature graphs for objects observed within a captured visual scene of interest. Additionally, a semantic scene graph pipeline of the scene feature extractor and feature classifier system may operate to integrate a plurality of object nodes and any associated multi-feature graphs for those nodes along with other attribute nodes for the visual scene of interest.

The semantic scene graph shows an object node 702 for "Jim" with an association edge to a feature vector node 715 for a right profile view and another feature vector node 717 for a full face view for image data captured of the visual scene. Associated likelihood values of 92% for the right profile feature vector node 715 and 75% for the full face feature node 717 may be generated via proximity within a neighborhood of previous occurrences of right profile and full face views labeled for "Jim" 702 with the current observation of a first person within the scene of interest. The cumulative likelihood of the first person identified within the visual scene of interest being "Jim" 702 is 98% due to these feature vector nodes 715 and 717 as well as the association edge 719 linking "Jim" 702 with the location node Chicago 725. Further semantic scene graph associations with a second observed person within the visual scene of interest include association edges 740 and 742 with two friends of "Jim" 702 both with reasonable probability of being present with "Jim" 702.

As discussed above, "Sam" 704 is believed with high likelihood, via labeled association edge 740 at 94%, of being friends with "Jim" 702. Further the multi-feature graph of a second observed person and the candidates of "Sam" 704 as well as "Harry" 706 leans the likelihood toward "Sam" 704. Besides feature vector nodes in the multi-feature graph for a full face feature vector 720, a left profile feature vector node 722, and a voice signature feature vector node 724 having substantial match likelihoods, "Sam" 702 also has an association edge 736 with a likelihood label of 90% that he is near the same location Chicago 725 as "Jim" 702. The multi-feature graph for the second observed person includes a 78% match to full face feature vector 720 labeled as associated with "Sam" 704. The multi-feature graph for the second observed person further includes a 82% match to a full face feature vector node 724 and 72% match for a voice signature feature vector node 724 associated with "Sam" 704. These factors including both the multi-feature graph as linked with the semantic scene graph results in the scene feature extractor and feature classifier system assigning an overall likelihood that the second observed person at 93% may be correctly labeled as "Sam" 704.

The other candidate for identity of a second observed person within a scene of interest includes "Harry" as shown at node 706. An association edge 742 has a fairly high friendship affinity criteria level at 84% between "Harry" 706 and "Jim" 702 which may reach a threshold level for consideration of "Harry" 706 as the second observed person in the scene of interest. However, the multi-feature graph generated for a second person of interest tends to favor "Harry" 706 less than "Sam" 704. The node "Harry" 706 includes a feature instance association edge between the node "Harry" 706 and a frontal face feature vector node associated with "Harry" 706. The likelihood match as discerned by the multi-feature scene graph for the full face instance of the second person of interest being "Harry" 706 is determined to be 15%. Similarly, the node "Harry" 706 includes feature instance association edges between "Harry" 706 and feature vector nodes for left profile view 728 and a voice signature feature vector node 730. The multi-feature graph and feature space analysis of the left profile view of the second person of interest results in a match with "Harry" 706 left profile views in past instances at 26%. The multi-feature graph and feature space analysis of the recorded voice signature of the second person of interest results in a match with "Harry" 706 voice signature in past instances at 32%.

The semantic scene graph generated by the scene feature extractor and feature classifier system further contributes to determination of an overall likelihood 762 that the second person observed in a scene of interest is "Harry" 706. For example, the association edge 742 indicating a friendship affinity criteria likelihood of 84% may increase the likelihood that the second person is "Harry" 706, however not more strongly that for "Sam" 704 with a friendship criteria level at 94% along association edge 740. Further, the node for "Harry" 706 does not have sufficient criteria value to establish an association edge between the node "Harry" 706 and the location attribute node for Chicago 725. Moreover, a criteria value may establish an association edge 738 between the node "Harry" 706 and a location attribute node for different location New York 735. The criteria value of 93% is determined for the association edge 738 that "Harry" 706 is at a New York location indicated by location node 735. This provides further evidence that "Harry" 706 is not in Chicago. These factors are considered within a probabilistic graph modeling algorithm among the various feature vector nodes and association edges in the semantic scene graph to conclude that the overall likelihood of 64% 762 that the second observed person in a scene of interest is "Harry" 706.

The semantic scene graph of FIG. 7 is but one example semantic scene graph that may be generated by the scene feature extractor and feature classifier system according to embodiments herein. It is understood that the semantic scene graph including the identified nodes, generated likelihood values, criteria values, and association edges may be generated in any graph structure with any number of nodes, association edges or other aspects of an observed visual scene of interest. The semantic scene graph of FIG. 7 is simplified to two observed persons of interest and multi-factor graph detail is omitted or summarized in parts for object nodes within the semantic scene graph of FIG. 7. It is contemplated that larger semantic scene graphs may be generated for larger numbers of objects, sub-components, and feature vector types with respect to observations of visual scenes of interest in accordance with embodiments herein. All values shown in FIG. 7 are example data points and it is understood that the scene feature extractor and feature classifier system may generate data for likelihood levels and criteria levels according to execution of algorithms or customized variations of algorithms described in embodiments herein. Values in FIG. 7 example values for explanatory purposes only.

The blocks of the flow diagrams of FIGS. 4-7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer system executing code of visual scene feature extractor and feature classifier system comprising:
a processor executing object recognition on a captured image of a visual scene of interest to identify a first object and a second object in the visual scene of interest and a set of feature attributes captured for the first and second object;
the processor executing code instructions for the visual scene feature extractor and classifier to assign a first object candidate node for the first object and a second object candidate node for the second object;
the processor associating feature vector values for feature attributes of the first object with the first candidate object node and of the second object with the second object candidate node to relate to labeled, previously-observed feature vector values for assessment of relationship to the first object or the second object;
the processor to determine an association edge between the first object candidate node and the second object candidate node, wherein the association edge represents a quantified association likelihood between the first object candidate node and the second object candidate node;
the processor to determine a likelihood for accuracy of conclusions of predicted semantic behavior of the first object based in part on the feature vector values and boosted by the association edge providing contextualization between the first object candidate node and the second object candidate node; and
the processor generating an indication of the predicted semantic behavior.

2. The computer system of claim 1 further comprising:
the processor to generate labels for association edges of previously-observed instances of candidate objects having the plurality of labeled, previously-observed feature vector values to generate likelihoods for the identity of at least the first object or the second object.

3. The computer system of claim 1, wherein the feature attributes include an image view of the first object and an image view of the second object.

4. The computer system of claim 1 wherein the feature attributes include a plurality of image views of the first object or the second object having feature vector values for the first object or the second object in a multi-feature graph to assess the first object via the first object candidate node.

5. The computer system of claim 1 further comprising:
the processor to determine a location attribute candidate node for the visual scene of interest and a location association edge between the location attribute candidate node and the first object candidate node or the second object candidate node including a likelihood of accuracy for that location association edge boosting conclusions of predicted semantic behavior of the first object via contextual information about the location of the first object or second object.

6. The computer system of claim 1 further comprising:
the processor to determine an attribute node for the visual scene of interest and an attribute association edge between the attribute node and the first or second object candidate node boosting conclusions of predicted semantic behavior of the first object, wherein the attribute node may relate to an environment attribute of the visual scene of interest.

7. The computer system of claim 1 further comprising:
the processor executing code to generate conclusions of predicted semantic behavior of the first object veracity of the identity of the first object and the identity of the second object and relationships between the first object and the second object indicated by at least one association edge.

8. The computer system of claim 1 further comprising:
the processor executing object recognition to selectively identify object candidate nodes for the first object and the second object in the visual scene of interest based on a predefined, minimum threshold of similarity.

9. The computer system of claim 1 wherein the first object is a first person in the visual scene of interest, the second object is a second person in the visual scene of interest, and the association edge between the first object candidate node and the second object candidate node includes an affinity label predicting a relationship between the first person and the second person.

10. A computer system executing code of visual scene feature extractor and feature classifier system comprising:
a processor executing object recognition on a captured image of a visual scene of interest to identify a first object and a second object in the visual scene of interest and a set of feature attributes captured for the first and second object;
the processor executing code instructions for the visual scene feature extractor and classifier to assign a first object candidate node for the first object and a second object candidate node for the second object and associating feature vector values for feature attributes of the first object with the first candidate object node and of the second object with the second object candidate node, the feature vector values relating to currently observable or previously-observed features of the first object or the second object;
the processor to determine an association edge between the first object candidate node and the second object candidate node, where the association edge represents a quantified association likelihood between the first object candidate node and the second object candidate node to boost an ontological conclusion about the first object such as an identity of the first object; and
the processor generating an indication of the likelihood of the ontological conclusion about the first object.

11. The computer system of claim 10 further comprising:
the visual scene feature extractor to predict a semantic behavior of the first object and the second object by determining a weighted likelihood value for the association edge with a labeled affinity between the object candidate nodes for the first object and the second object describing a proposed relationship conclusion.

12. The computer system of claim 10, wherein the feature attributes include an image view of the first object and an image view of the second object.

13. The computer system of claim 10 further comprising:
the processor to generate labels for association edges of previously-observed instances of candidate objects having the plurality of labeled, previously-observed feature vector values to further the indication of the likelihood of the ontological conclusion about the first object.

14. The computer system of claim 10 further comprising:
the processor to determine a location attribute candidate node for the visual scene of interest and a location association edge between the location attribute candidate node and the first object candidate node or the second object candidate node including a likelihood of accuracy for that location association edge boosting conclusions of predicted semantic behavior of the first object via contextual information about the location of the first object or second object.

15. The computer system of claim 10 further comprising:
the processor to determine an attribute node for the visual scene of interest and an attribute association edge between the attribute node and the first or second object candidate node boosting conclusions of predicted semantic behavior of the first object, wherein the attribute node may relate to an environment attribute of the visual scene of interest.

16. The computer system of claim 10, wherein the first object is a first person in the visual scene of interest, the second object is a second person in the visual scene of interest, and the association edge between the first object candidate node and the second object candidate node includes an affinity label predicting a relationship between the first person and the second person.

17. A computer system executing code of visual scene feature extractor and feature classifier system comprising:
a processor executing object recognition on a captured image of a visual scene of interest to identify a first object and a second object in the visual scene of interest and a first set of feature attributes captured for the first and a second set of feature attributes captured for the second object;
the processor executing code instructions for the visual scene feature extractor and classifier to assign a first object candidate node for the first object and a second object candidate node for the second object and associating feature vector values for the first feature attributes of the first object with the first candidate object node and for the second feature attributes of the second object with the second object candidate node, the feature vector values relating to currently observable or previously-observed features of the first object or the second object;

the processor to determine an association edge between the first object candidate node and the second object candidate node, where the association edge represents a quantified association likelihood between the first object candidate node and the second object candidate node to boost an ontological conclusion about the first object such as an identity of the first object, where the association edge between the first object candidate node and the second object candidate node includes an affinity label predicting a relationship between the first object and the second object; and the processor generating an indication of the likelihood of the ontological conclusion about the first object.

18. The computer system of claim 17 further comprising:
the visual scene feature extractor to predict a semantic behavior of the first object and the second object by determining a weighted likelihood value for the association edge with a labeled affinity between the object candidate nodes for the first object and the second object describing a proposed relationship conclusion.

19. The computer system of claim 17 wherein the first object is a first person in the visual scene of interest, the second object is a second person in the visual scene of interest, and the association edge between the first object candidate node and the second object candidate node includes an affinity label predicting a relationship between the first person and the second person.

20. The computer system of claim 17, wherein the feature attributes include an image view of the first object and an image view of the second object.

* * * * *